United States Patent
Koh et al.

(10) Patent No.: US 8,814,391 B2
(45) Date of Patent: Aug. 26, 2014

(54) LIGHT GUIDING STRUCTURE

(75) Inventors: Zhi-Wei Koh, Hsinchu County (TW); Chi-Jen Kao, Taipei (TW); Wen-Chiun Ing, Taipei County (TW); Wei-Hsin Hou, Taipei (TW)

(73) Assignee: Luxingtek, Ltd., Zhubei (TW)

( * ) Notice: Subject to any disclaimer, the term of this patent is extended or adjusted under 35 U.S.C. 154(b) by 291 days.

(21) Appl. No.: 13/200,074

(22) Filed: Sep. 16, 2011

(65) Prior Publication Data

US 2012/0069579 A1   Mar. 22, 2012

Related U.S. Application Data

(63) Continuation-in-part of application No. 12/885,949, filed on Sep. 20, 2010.

(51) Int. Cl.
 *F21V 5/02* (2006.01)

(52) U.S. Cl.
 USPC ............. 362/311.02; 362/522; 362/97.3; 362/311.06; 362/330; 362/336; 313/512

(58) Field of Classification Search
 USPC .......... 362/545, 511, 520, 522, 97.3, 311.01, 362/311.02, 311.06, 326, 330, 335, 336; 313/512
 See application file for complete search history.

(56) References Cited

U.S. PATENT DOCUMENTS

| | | | |
|---|---|---|---|
| 6,097,549 A * | 8/2000 | Jenkins et al. | 359/726 |
| 6,356,394 B1 * | 3/2002 | Glienicke | 359/641 |
| 6,679,621 B2 | 1/2004 | West et al. | |
| 7,021,805 B2 * | 4/2006 | Amano et al. | 362/518 |
| 7,111,964 B2 * | 9/2006 | Suehiro et al. | 362/328 |
| 7,246,931 B2 | 7/2007 | Hsieh et al. | |
| 7,258,473 B2 | 8/2007 | Okamura | |
| 7,334,933 B1 * | 2/2008 | Simon | 362/615 |
| 7,413,318 B2 | 8/2008 | Hsu et al. | |
| 7,414,270 B2 | 8/2008 | Kim et al. | |
| 7,438,445 B2 * | 10/2008 | Shiau et al. | 362/333 |
| 7,458,714 B2 | 12/2008 | Chang | |
| 7,549,781 B2 | 6/2009 | Kim et al. | |
| 7,585,083 B2 | 9/2009 | Kim et al. | |
| 8,177,378 B2 * | 5/2012 | Ohkawa | 362/97.1 |
| 2005/0286251 A1 * | 12/2005 | Smith | 362/327 |
| 2006/0067640 A1 * | 3/2006 | Hsieh et al. | 385/146 |
| 2006/0126343 A1 * | 6/2006 | Hsieh et al. | 362/327 |
| 2008/0055931 A1 | 3/2008 | Verstraete et al. | |
| 2008/0151551 A1 | 6/2008 | Yang et al. | |
| 2011/0249214 A1 | 10/2011 | Cheong et al. | |

OTHER PUBLICATIONS

Office Action for Taiwanese counterpart application to the present US application, Nov. 21, 2013, 11 pages (including English summary).

* cited by examiner

*Primary Examiner* — Ismael Negron
(74) *Attorney, Agent, or Firm* — Skaar Ulbrich Macari, P.A.

(57) ABSTRACT

A light guiding structure includes a light transmissive body and microstructures; the light transmissive body includes an upper conical groove and a lower accommodating groove, and the upper conical groove has a curved surface with a continually varied slope; the microstructures are disposed on the light transmissive body. A lighting device includes a circuit board, a light source and the aforesaid light guiding structure; the light source and the light guiding structure are disposed on the circuit board, and the light source is accommodated within the lower accommodating groove.

27 Claims, 36 Drawing Sheets

LIGHT GUIDING STRUCTURE

PRIORITY

This application is a continuation-in-part of U.S. patent application Ser. No. 12/885,949, filed on Sep. 20, 2010, which is hereby incorporated by reference herein in its entirety.

FIELD

The present invention relates to a direct-lit light guiding structure, a direct-lit light guiding panel and a lighting device, and more particularly, to a direct-lit light guiding structure and a direct-lit light guiding panel capable of uniformizing intensity of light rays and a lighting device adopting the direct-lit light guiding structure or the direct-lit light guiding panel.

BACKGROUND

Nowadays, more and more flat lighting devices are adopting a plurality of light emitting diodes (LEDs) as a light source in place of the traditional incandescent lamps or fluorescent lamps. When being used as a light source in such a flat lighting device, the LEDs are typically disposed directly at the bottom of the flat lighting device. The LEDs emit light rays, and the light rays have the maximum intensity in a normal viewing direction (i.e., in a direction perpendicular to light emitting surfaces of the LEDs). Therefore, the light rays from the flat lighting device are non-uniform, and a local dark spot (i.e., an area having the minimum light intensity) or a local bright spot (i.e., an area having the maximum light intensity) can be seen.

To eliminate the local dark spot or local bright spot described above, a light diffuser plate may be disposed in front of and spaced apart from the LEDs. However, this increases the overall thickness of the flat lighting device. Another approach to eliminate the local dark spot or local bright spot is to increase the number of LEDs. However, this adds to the manufacturing cost of the flat lighting device.

Accordingly, an urgent need exists in the art to overcome at least one of the aforesaid shortcomings

SUMMARY

An objective of certain embodiments of the present invention is to provide a direct-lit light guiding structure, a direct-lit light guiding panel and a lighting device. The direct-lit light guiding structure and the direct-lit light guiding panel can receive light rays and then output the light rays uniformly; and the lighting device can adopt the direct-lit light guiding structure or the direct-lit light guiding panel.

Direct-lit light guiding structures according to certain embodiments of the present invention include a light transmissive body and a plurality of microstructures. The light transmissive body comprises an upper surface, a lower surface, an upper conical groove and a lower accommodating groove. The upper conical groove is formed on the upper surface, and the lower accommodating groove is formed on the lower surface. The upper conical groove has a curved surface with a continually varied slope. The microstructures are disposed on the light transmissive body.

Direct-lit light guiding panels according to certain embodiments of the present invention include a plurality of direct-lit light guiding structures described above. The light transmissive bodies of the direct-lit light guiding structures are connected to one another.

Lighting device according to certain embodiments of the present invention include at least one circuit board, at least one light source and at least one direct-lit light guiding structure described above. The at least one circuit board comprises a top surface and a bottom surface. The at least one light source is disposed on the top surface of the circuit board. The at least one direct-lit light guiding structure is disposed on the top surface of the at least one circuit board, and the at least one light source is accommodated in the lower accommodating groove of the at least one direct-lit light guiding structure.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

In the following description, various aspects of the present invention are disclosed with reference to example embodiments thereof. It should be appreciated that these example embodiments are not intended to limit the present invention to any specific environment, example, embodiment, applications or particular implementations described in these embodiments. Therefore, the description of these embodiments is only for purposes of illustration rather than limitation.

Figure 1:
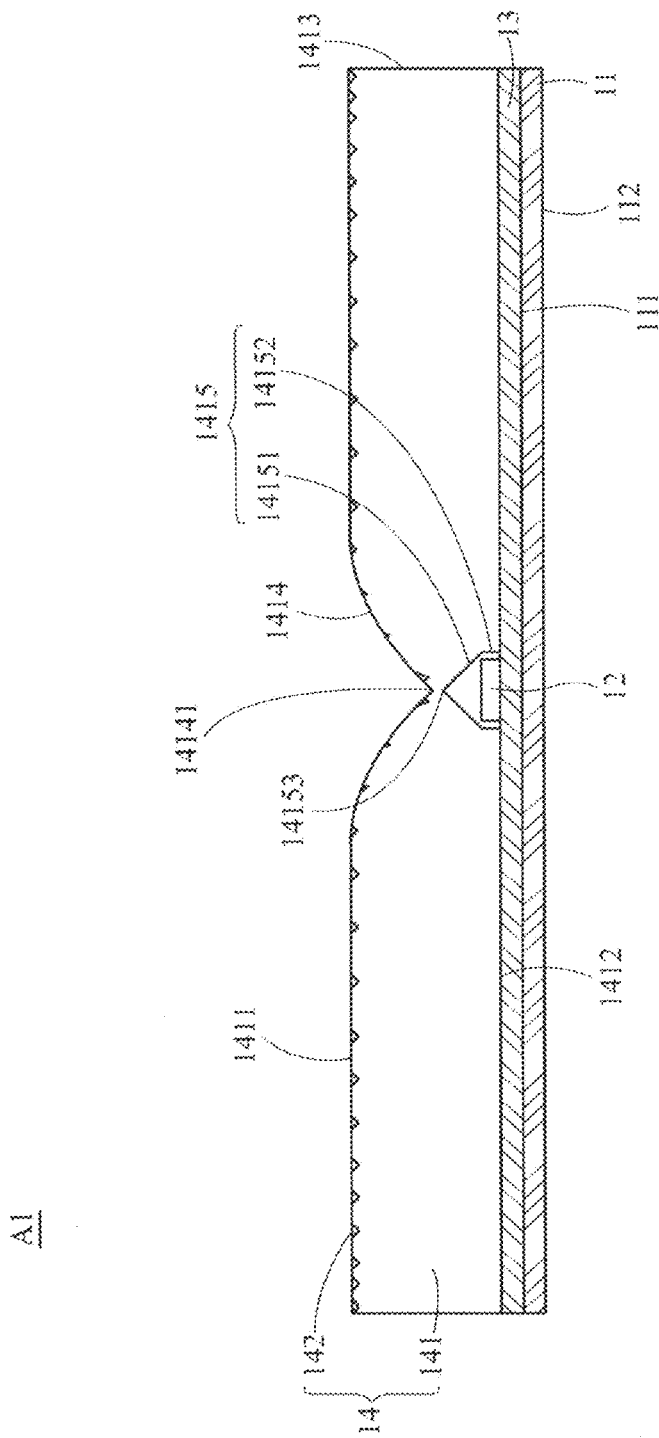
FIG. 1 is a cross-sectional view of a lighting device according to a first preferred embodiment of the present invention.
Figure 2:
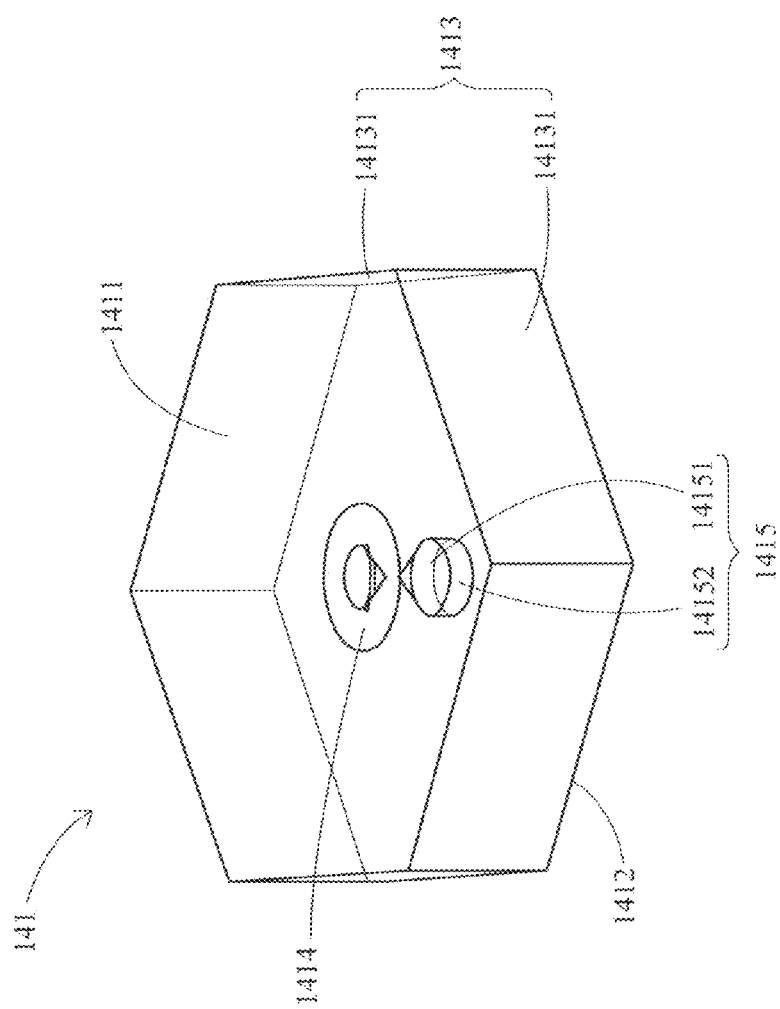
FIG. 2 is a perspective view of a light transmissive body of a direct-lit light guiding structure shown in FIG. 1.

Referring to FIG. 1 and FIG. 2 together, FIG. 1 is a cross-sectional view of a lighting device according to a first preferred embodiment of the present invention, and FIG. 2 is a perspective view of a light transmissive body of a direct-lit light guiding structure shown in FIG. 1. The lighting device A1 of this embodiment comprises a circuit board 11, a light source 12, a reflective layer 13 and a direct-lit light guiding structure 14A, which will be described in sequence hereinbelow.

The circuit board 11 is used to support other elements of the lighting device 1 and transmit electric power to the light source 12. The circuit board 11 may be a common printed circuit board (PCB), or may be a metal-core printed circuit board (MCPCB) in order to improve the heat dissipation efficiency of the circuit board 11. Additionally, the circuit board 11 comprises a top surface 111 and a bottom surface 112 opposite to the top surface 111.

The light source 12 is used to receive the electric power to emit light rays, and is disposed on the top surface 111 of the circuit board 11. The light source 12 is further electrically connected to the circuit board 11 to receive the electric power transmitted by the circuit board 11. The light source 12 may be a wire bonded LED, a flip-chip LED, a surface mount device (SMD) type LED or an LED of some other type.

The reflective layer 13 is used to reflect light rays, and may be disposed on the top surface 111 of the circuit board 11 so that it is impossible for the light rays to transmit through the circuit board 11 (functions of the reflective layer 13 will be further described with reference to FIG. 3A). The reflective layer 13 may cover almost the whole top surface 111 except the area where the light source 12 is located. The reflective layer 13 may be made of a plastic material (e.g., PET, PP, PE, PVC, PC, PMMA, PU, PS, ABS or some other plastic material) coated with a white coating or may be made of a metal (e.g., Al, Ag, Ni, Mo, Zn, Pt, Au, Cu or some other metal or an alloy thereof); alternatively, the reflective layer 13 may be made of a plastic material comprising a plurality of reflective particles (e.g., $TiO_2$, $CaCO_3$, $ZnO_2$, $SiO_2$, $Al_2O_3$, $SnO_2$, $CeO_2$ particles, or metal particles). The reflective layer 13 may be disposed on the circuit board 11 through sputtering, thermal evaporation, coating, adhesion or the like.

The reflective layer 13 may also be disposed on a lower surface 1412A of the direct-lit light guiding structure 14A that is to be described later. In this case, the reflective layer 13 may be applied to cover almost the whole lower surface 1412A except an area where a lower accommodating groove 1415A is located.

The direct-lit light guiding structure 14A is used to receive light rays and then output the light rays uniformly. The direct-lit light guiding structure 14A may be disposed on the top surface 111 of the circuit board 11 (i.e., above the top surface 111) and on the reflective layer 13; in other words, the reflective layer 13 is disposed between the direct-lit light guiding structure 14A and the circuit board 11.

The direct-lit light guiding structure 14A may comprise a light transmissive body 141A and a plurality of microstructures 142. The light transmissive body 141A may be made of any transparent or translucent polymer materials, for example, silicone, cyclic olefin copolymer, polyurethane, polystyrene, polyester, polyethylene terephthalate (PET), polycarbonate (PC), polyimide (PI), polymethylmethacrylate (PMMA), acrylonitrile-butadiene-styrene copolymer (ABS), polyethylene (PE), polypropylene (PP), or a combination thereof. Furthermore, the light transmissive body 141A may be produced through injection molding, molding, extruding, pressing, embossing or the like manufacturing process.

The light transmissive body 141A may comprise an upper surface 1411A, a lower surface 1412A, an outer peripheral surface 1413, an upper conical groove 1414A and a lower accommodating groove 1415A. In this embodiment, both the upper surface 1411A and the lower surface 1412A are a planar surface, and are parallel to and opposite to each other; and the lower surface 1412A makes contact with the reflective layer 13. The outer peripheral surface 1413 is located between the upper surface 1411A and the lower surface 1412A and connects the upper surface 1411A and the lower surface 1412A. The outer peripheral surface 1413 may comprise six side surfaces 14131 connected to one another, each of which is perpendicular to the lower surface 1412A.

The upper conical groove 1414A is formed on the upper surface 1411A, or it can be said that a portion of the upper surface 1411A is recessed downward to form the upper conical groove 1414A so that the upper surface 1411A is partially turned into a curved surface. The lower accommodating groove 1415A is formed on the lower surface 1412A and corresponding to the upper conical groove 1414A; or it can be said that a portion of the lower surface 1412A is recessed upward to form the lower accommodating groove 1415A. The lower accommodating groove 1415A may have a conical portion 14151 and a columnar portion 14152 communicating with each other. The light source 12 can be accommodated in the lower accommodating groove 1415A.

A tip point 14141 (i.e., the lowest point) of the upper conical groove 1414A may be vertically aligned with a tip point 14153 (i.e., the highest point) of the conical portion 14151 of the lower accommodating groove 1415A; in other words, the tip point 14141 of the upper conical groove 1414A may be located directly above the tip point 14153 of the conical portion 14151.

The surface of the upper conical groove 1414A is designed according to the edge-ray principle so that light rays impinging on the surface of the upper conical groove 1414A will be totally reflected instead of being transmitted therethrough. With this design, the surface of the upper conical groove 1414A becomes a curved surface having a continually varied slope; in other words, formation of the upper conical groove 1414A can turn the upper surface 1411A into a curved surface having a continually varied slope. A slope of each point of the curved surface can make "the light rays impinging on that point at a specific incident angle" totally reflected. Hereinbelow, the total reflection described above will be further described.

Figure 3A:
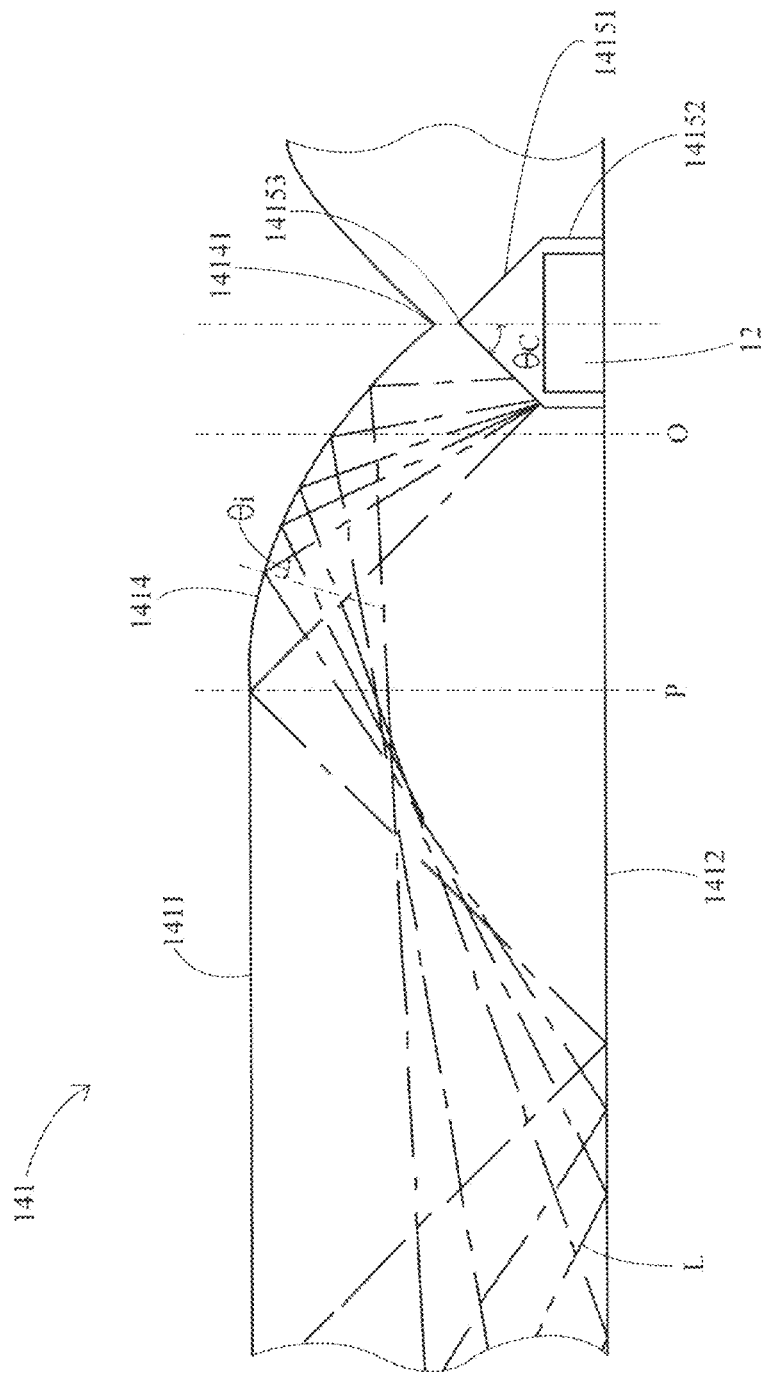
FIG. 3A is a schematic view illustrating propagation of light rays in the light transmissive body shown in FIG. 1.

Referring to FIG. 3A together, there is shown a schematic view illustrating propagation of light rays in the light transmissive body shown in FIG. 1. The light rays L emitted by the light source 12 can transmit through the surface of the lower accommodating groove 1415A into the light transmissive body 141A. When transmitting through the surface of the lower accommodating groove 1415A, the light rays L are refracted to propagate toward the upper conical groove 1414A. That is, the surface of the lower accommodating groove 1415A has a function of guiding the light rays.

Additionally, the light rays L are emitted almost from a front surface (i.e., a top surface) of the light source 12, so only the surface of the lower accommodating groove 1415A that is located directly above the front surface of the light source 12 has light rays L transmitted therethrough and, consequently, needs to have the function of guiding the light rays. In other words, the surface of the lower accommodating groove 1415A that is located below the front surface of the light source 12 (i.e., the surface of the columnar portion 14152) does not need to have the function of guiding light rays.

The light rays L then impinge on different points of the curved surface of the upper conical groove 1414A. Because incident angles of the light rays L are greater than a critical angle defined by the light transmissive body 141A and an environment where the light transmissive body 141A is located (which is about 42° in this embodiment), the light rays L are reflected by the curved surface instead of transmitting therethrough.

The light rays L reflected by the curved surface propagate toward the outer peripheral surface 1413 of the light transmissive body 141A. A part of the light rays L impinge on the lower surface 1412A (or the upper surface 1411A), and are then reflected by the lower surface 1412 (or the upper surface 1411A) because the incident angles thereof are still greater than the critical angle. The light rays reflected by the lower surface 1412A (or the upper surface 1411A) then continue to propagate toward the outer peripheral surface 1413 of the light transmissive body 141A.

As can be known from the above, the light transmissive body 141A can make the light rays emitted from the light source 12 propagate laterally without being concentrated near the light source 12 or being emitted upward directly.

The upper surface 1411A and the lower surface 1412A may be unsmoothed or non-level due to manufacturing tolerances or manufacturing errors. Therefore, some of the light rays L will transmit through the lower surface 1412A when impinging on the lower surface 1412A. The light rays transmitting through the lower surface 1412A are then reflected by the reflective layer 13 of the lower surface 1412A back into the light transmissive body 141A to ensure that no leakage of the light rays L occurs through the lower surface 1412A of the light transmissive body 141A.

Figure 3B:
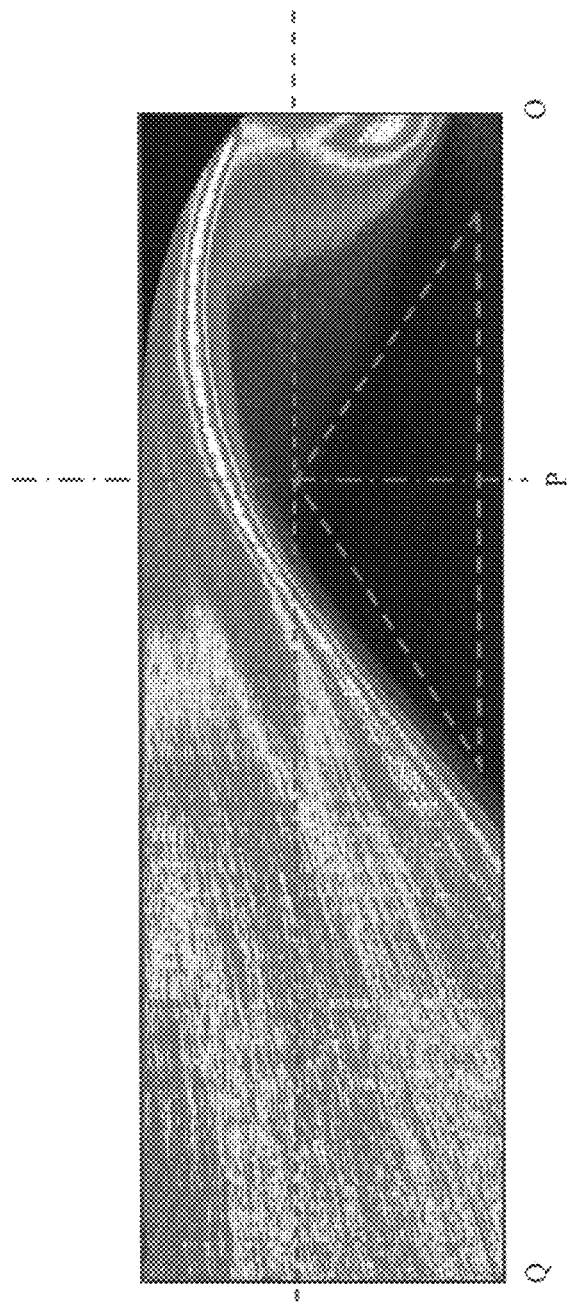
FIG. 3B is a graph of energy distribution of light rays in the light transmissive body shown in FIG. 1.

Referring to FIG. 3B together, there is shown a graph of energy distribution of light rays in the light transmissive body. This graph may be obtained through experimental measurement or through simulation. In this figure, the black portions represent portions where only a small amount of (i.e., weak) light rays transmit therethrough. It may be further known from the light distribution that, in the absence of the microstructures 142, the light rays scarcely transmit through the upper conical groove 1414A; rather, the light rays are totally reflected by the upper conical groove 1414A, the upper surface 1411A and the lower surface 1412A, and then propagate toward the outer peripheral surface 1413 of the light transmissive body 141A.

Figure 3C:
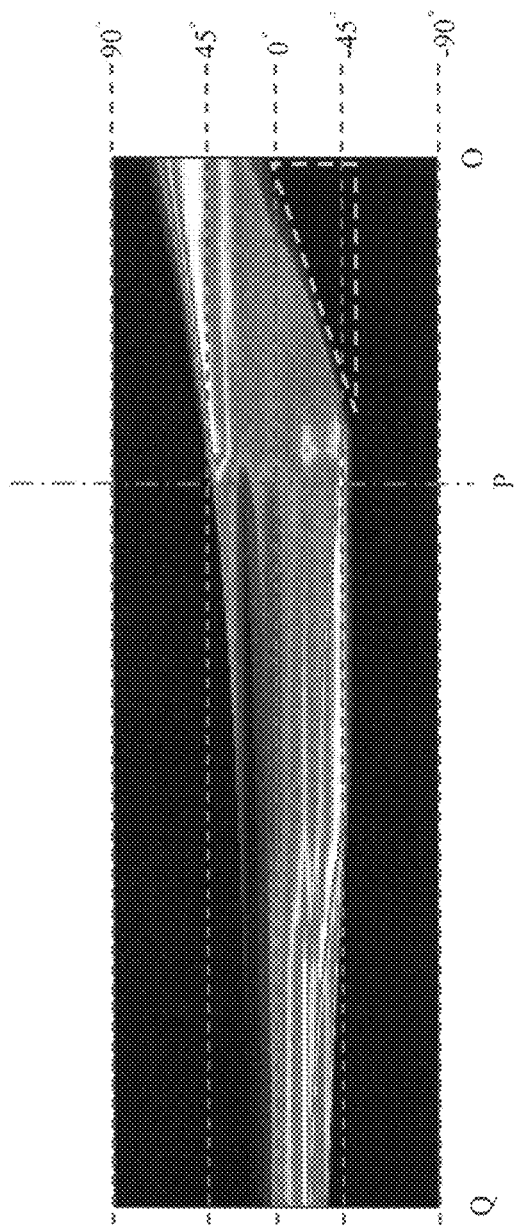
FIG. 3C is a graph of angular distribution of light rays corresponding to FIG. 3B.

Referring to FIG. 3C together, there is shown a graph of angular distribution of light rays corresponding to FIG. 3B. After being reflected by the upper conical groove 1414A (i.e., after the point P), angles of the light rays are distributed within a range of −45° to 45°, and complementary angles thereof are all greater than the critical angle (i.e., 42°). Therefore, the light rays reflected by the upper conical groove 1414A will still be totally reflected when impinging on the upper surface 1411A and the lower surface 1412A.

Referring back to FIG. 3A, it shall be appreciated that, a half-cone angle $\theta_c$ of the conical portion 14151 of the lower accommodating groove 1415A and an incident angle $\theta_i$ of the light rays L impinging on the upper conical groove 1414A have an influence on the size of the light transmissive body 141A. There are a lot of light rays L and each of them impinges on the upper conical groove 1414A at a different incident angle $\theta_i$. As the half-cone angle $\theta_c$ of the conical portion 14151 is closer to a complementary angle of the critical angle and the minimum incident angle $\theta_i$ is closer to the critical angle, the thickness of the light transmissive body 141A becomes smaller.

In this embodiment, the half-cone angle $\theta_c$ of the conical portion 14151 of the lower accommodating groove 1415A is substantially equal to (i.e., very close to) the complementary angle of the critical angle and the minimum incident angle $\theta_i$ is substantially equal to (i.e., very close to) the critical angle, so the thickness of the light transmissive body 141A can be minimized if the manufacturing tolerances are not taken into account.

Figure 3D:
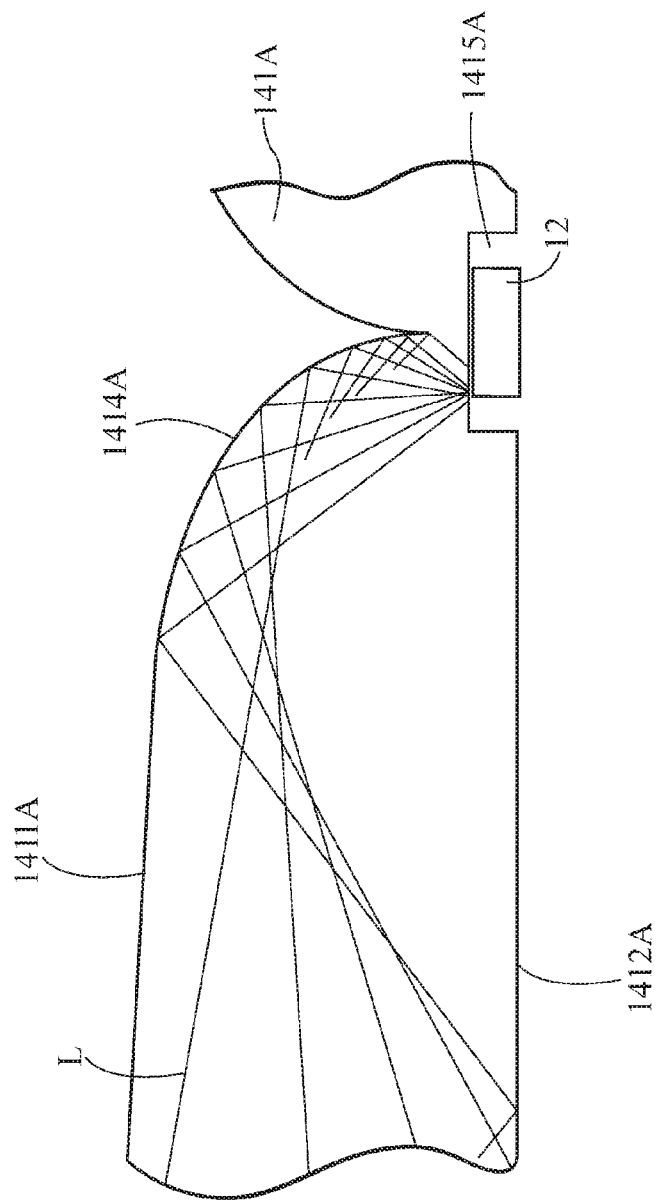
FIG. 3D is another schematic view illustrating propagation of light rays in the light transmissive body shown in FIG. 1.

Referring to FIG. 3D, there is shown another schematic view illustrating propagation of light rays in the light transmissive body shown in FIG. 1. When the half-cone angle $\theta_c$ of the conical portion 14151 of the lower accommodating groove 1415A is equal to 90°, the conical portion 14151 disappears and the lower accommodating groove 1415A substantially becomes a columnar groove. In this case, the size of the upper conical groove 1414A is altered so that the light rays L can still be reflected by the surface of the upper conical groove 1414A, but the thickness of the light transmissive body 141A becomes larger as compared to the case when the half-cone angle $\theta_c$ of the conical portion 14151 is equal to the complementary angle of the critical angle.

Referring back to FIG. 1, the microstructures 142 serve to disrupt or prevent total reflection of the light rays so that the light rays can exit from the light transmissive body 141A. The microstructures 142 are disposed on the light transmissive body 141A, and are distributed on the upper surface 1411A of the light transmissive body 141A and the curved surface of the upper conical groove 1414A.

The microstructures 142 may be recessed structures of a linear form, a dot form or any regular or irregular form. In this embodiment, the microstructure 142 are circular fin line trenches that are 30 micrometers (μm) in depth and 50 μm in width; and the microstructures 142 may also be protrusion structures. The microstructures 142, regardless of recessed structures or protrusion structures, may be formed integrally with the light transmissive body 141A. Additionally, the microstructures 142 may also be an ink material printed or coated on the light transmissive body 141A.

No matter what kind of structures the microstructures 142 are, portions of the light transmissive body 141A where the microstructures 142 are disposed become roughened and unsmoothed. Thus, when light rays impinge on these roughened portions, it is likely that the incident angles of the light rays become smaller than the critical angle so that the light rays are no longer totally reflected back into the light transmissive body 141A. This gives the light rays a chance to exit from the light transmissive body 141A. Furthermore, the further the microstructures 142 are from the tip point 14141 of the conical groove 1414A (or the light source 12), the greater the distribution density of the microstructures 142 will be; in other words, portions of the light transmissive body 141A that are further from the tip point 14141 have more microstructures 142 distributed therein.

The way in which the microstructures 142 are distributed allows the light rays to exit from the light transmissive body 141A uniformly. In more detail, areas near the tip point 14141 receive stronger (i.e., more) light rays and are formed with fewer microstructures 142, while areas far from the tip point 14141 receive weaker (i.e., fewer) light rays and are formed with more microstructures 142. Hence, intensity of light rays exiting from the areas near the tip point 14141 of the light transmissive body 141A will not vary greatly from that of light rays exiting from the areas far from the tip point 14141.

It shall be appreciated that, the microstructures 142 distributed on the curved surface of the upper conical groove 1414A are lower than the microstructures 142 distributed on the upper surface 1411A; i.e., the microstructures 142 vary in height. The microstructures 142 as a whole are in a three-dimensional (3D) distribution, which is different from the two dimensional (2D) distribution of microstructures of conventional light guide structures.

It shall be further appreciated that, uniformity of light rays exiting from the light transmissive body 141A is controlled by the non-uniform distribution of the microstructures 142 in the aforesaid embodiment. However, in case the microstructures 142 are distributed uniformly, the uniformity of light rays exiting from the light transmissive body 141A may also be controlled by changing the depth, size, angle or shape of the microstructures 142.

The lighting device A1 according to the first preferred embodiment has been described. Hereinafter, lighting devices according to other preferred embodiments will be described. For purpose of simplicity, similarities between the other preferred embodiments and the first embodiment as well as similarities between the other preferred embodiments will not be further described again.

Figure 4A:
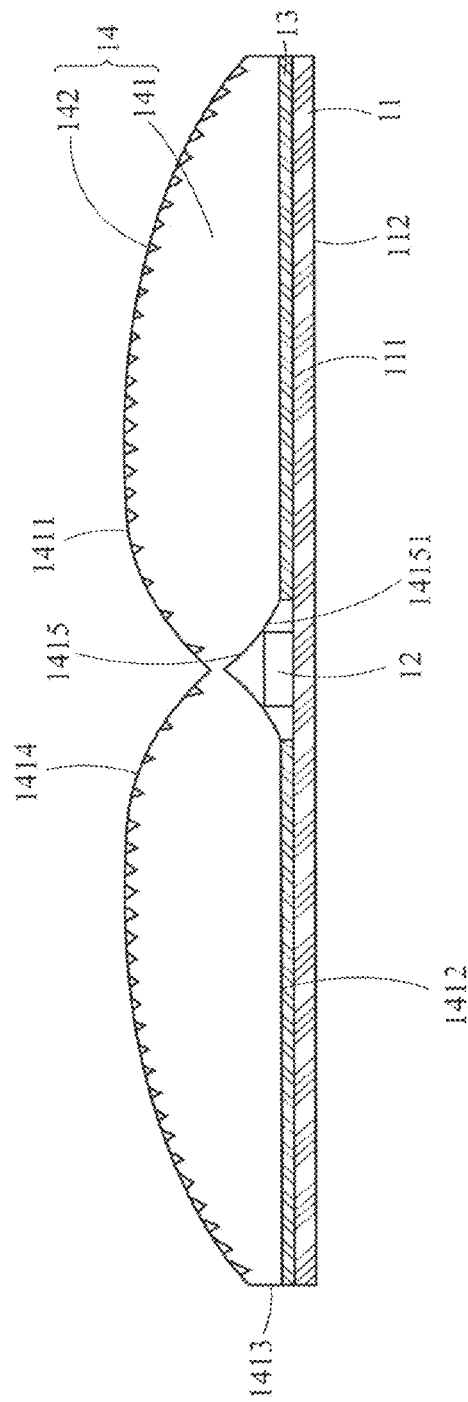
FIG. 4A is a cross-sectional view of a lighting device according to a second preferred embodiment of the present invention.

Referring to FIG. 4A, there is shown a cross-sectional view of a lighting device according to a second preferred embodiment of the present invention. The lighting device A2 of the second preferred embodiment differs from the lighting device A1 mainly in that, the upper surface 1411B of the light transmissive body 141B of the lighting device A2 is entirely not a flat surface but a curved surface. By forming the upper surface 1411B of the light transmissive body 141B as a curved surface, the light transmissive body 141B can be made to have a larger light emitting range as compared to the case where the upper surface 1411B is a flat surface.

Furthermore, when the upper surface 1411B is a curved surface, parameters of the microstructures 142, which may include the density, angle, shape or size of the microstructures 142, will vary correspondingly with the curvature of the curved surface. Taking the density as an example, there may be fewer microstructures 142 in areas of the upper surface 1411B that are near the outer peripheral surface 1413; this is because the total reflection of light rays can be disrupted also by the curved upper surface 1411B itself without the need to be disrupted all by the microstructures 142.

The lighting device A2 differs from the lighting device A1 also in that, the lower accommodating groove 1415B of the light transmissive body 141B of the lighting device A2 only comprises a conical portion 14151; i.e., the lower accommodating groove 1415B is just a lower conical groove. The lower accommodating groove 1415B in the form of a lower conical groove is used to accommodate a light source 12 that can emit light rays from both a front surface and side surfaces thereof; the reasons of which will be described as follows.

Figure 4B:
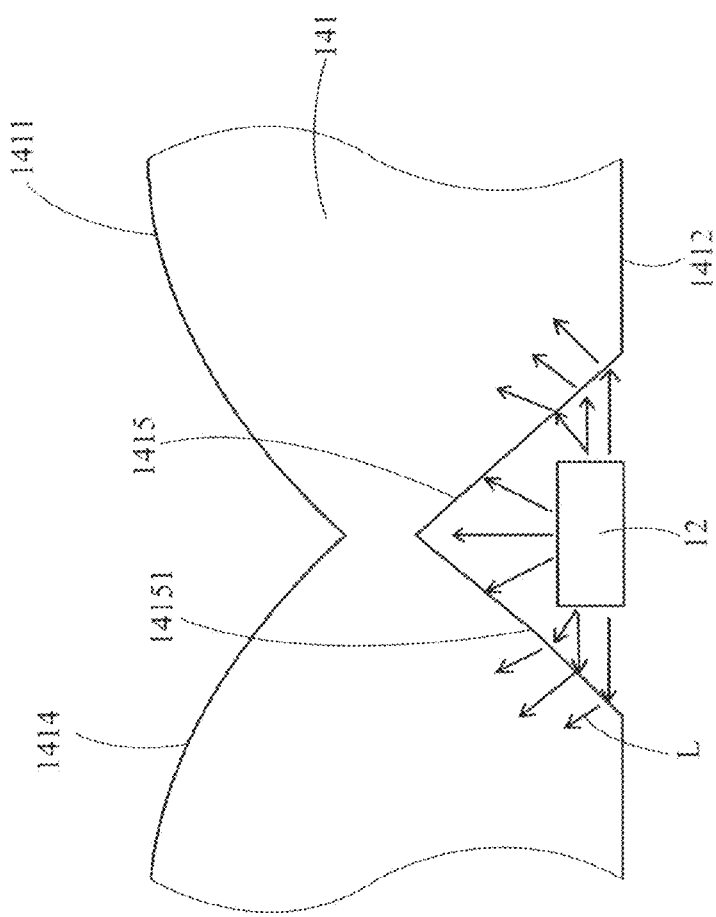
FIG. 4B is a schematic view illustrating propagation of light rays in the light transmissive body shown in FIG. 4A.

Referring to FIG. 4B, there is shown a schematic view illustrating propagation of light rays in the light transmissive body shown in FIG. 4A. Because the light source 12 emits light rays L from both the front surface and the side surfaces thereof, each point on the surface of the lower accommodating groove 1415B must be able to guide the light rays L toward the surface of the upper conical groove 1414B, and designing the lower accommodating groove 1415B as a lower conical groove can just satisfy such requirement.

Figure 5:
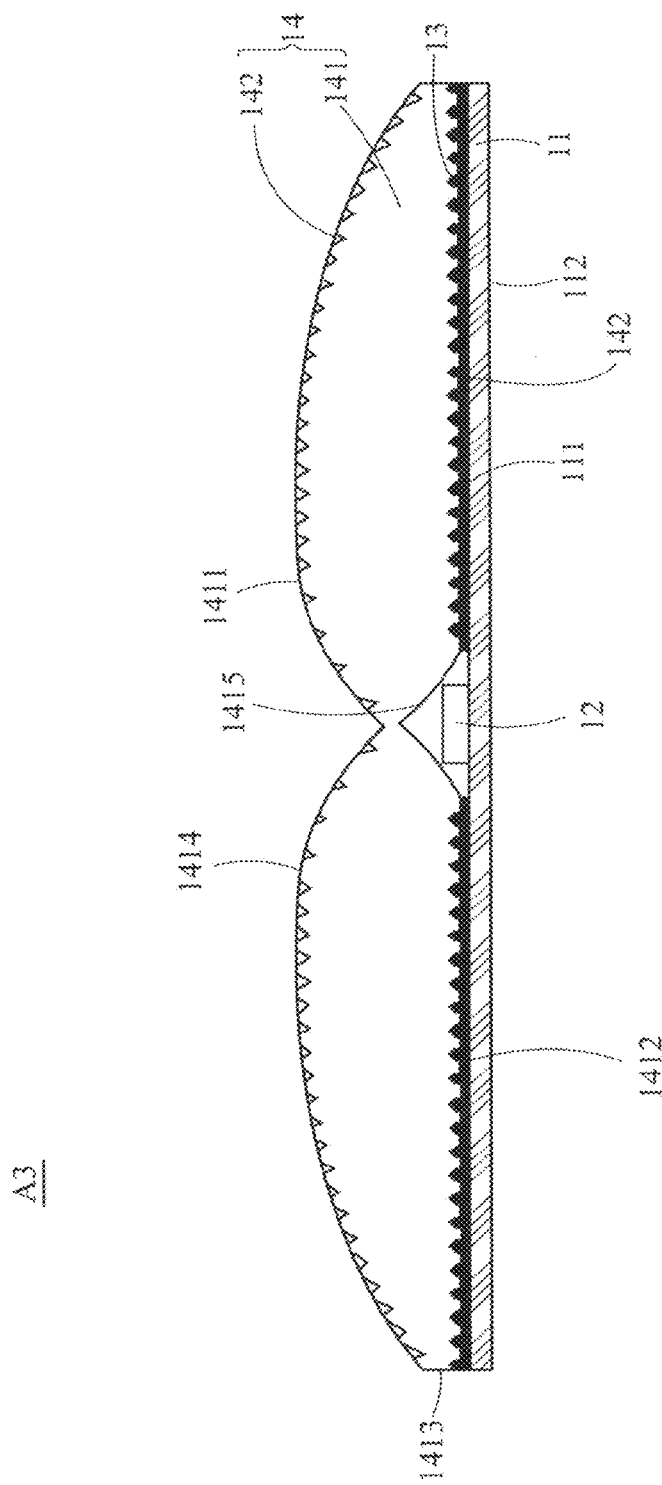
FIG. 5 is a cross-sectional view of a lighting device according to a third preferred embodiment of the present invention.
Figure 6:
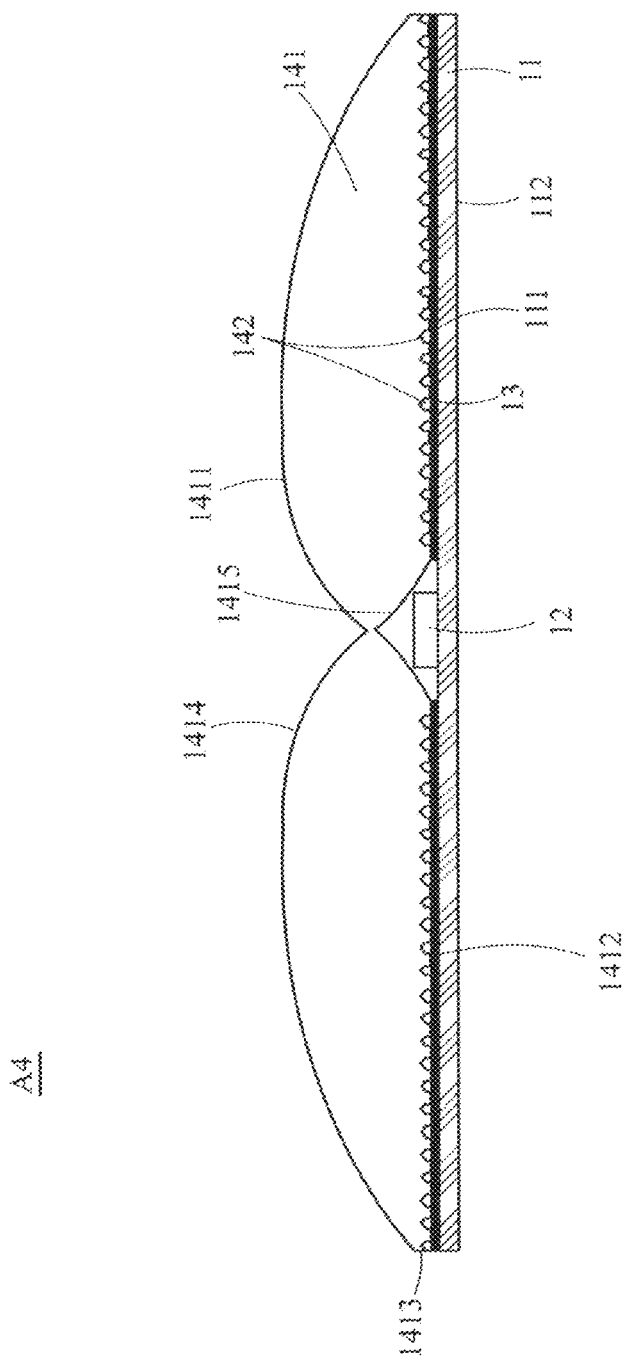
FIG. 6 is a cross-sectional view of a lighting device according to a fourth preferred embodiment of the present invention.

Referring to FIG. 5 and FIG. 6 together, cross-sectional views of lighting devices according to a third preferred embodiment and a fourth preferred embodiment of the present invention are shown therein respectively. The lighting device A3 of the third preferred embodiment differs from the lighting device A2 mainly in that, the lower surface 1412C of the light transmissive body 141C of the lighting device A3 also have microstructures 142 distributed thereon. Therefore, in addition to the microstructures 142 on the upper surface 1411C, the microstructures 142 on the lower surface 1412C can also serve to control intensity of the light rays outputted from the light transmissive body 141C.

The lighting device A4 of the fourth preferred embodiment differs from the lighting device A3 mainly in that, the microstructures 142 are not distributed on the upper surface 1411D of the light transmissive body 141D but are only distributed on the lower surface 1412D. The reflective layer 13 is disposed on the lower surface 1412D, but is not recessed into the microstructures 142. The lighting device A4 has the following features: a diffuser (may be a diffuser plate or a diffuser film) may be disposed on the upper surface 1411D (see FIG. 10A); when a spacing exists between the diffuser and the upper surface 1411D, non-uniformity in brightness is easier to be found on the diffuser; however, the non-uniformity in brightness on the diffuser will become less significant if the upper surface 1411D has no microstructures 142 distributed thereon.

Figure 7:
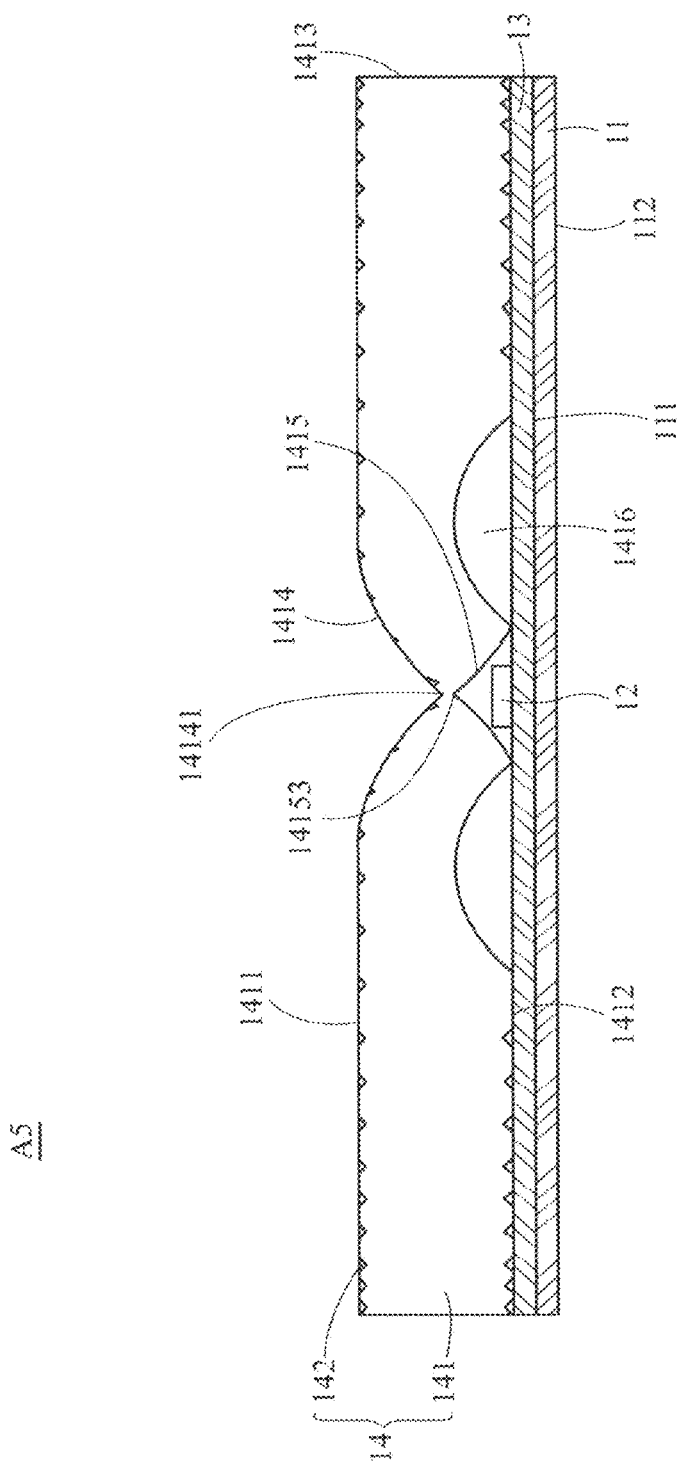
FIG. 7 is a cross-sectional view of a lighting device according to a fifth preferred embodiment of the present invention.

Referring to FIG. 7, there is shown a cross-sectional view of a lighting device according to a fifth preferred embodiment of the present invention. As compared to the lighting device A1, the light transmissive body 141E of the lighting device A5 of this embodiment further comprises a plurality of hollow grooves 1416.

These hollow grooves 1416 are formed on the lower surface 1412E of the light transmissive body 141E, and the lower accommodating groove 1415E is located between the hollow grooves 1416. Formation of the hollow grooves 1416 can reduce use of materials for manufacturing the light transmissive body 141E and, consequently, reduce the manufacturing cost of the light transmissive body 141E. The hollow grooves 1416 may each be a dome-shaped hollow groove or a cone-shaped hollow groove, but are not merely limited to such forms.

The hollow grooves 1416 have no influence on propagation of the light rays towards the outer peripheral surface 1413 of the light transmissive body 141E for the following reasons. Referring to FIG. 3A and FIG. 3B together, when the light rays L propagate in the light transmissive body 141A, there is almost no light rays propagating through portions of the light transmissive body 141A that are near the lower accommodating groove 1415A; these kinds of portions are removed to form the hollow grooves 1416. Therefore, there is almost no light ray (or only few light rays) propagating through the hollow grooves 1416, so the hollow grooves 1416 has no influence on propagation of the light rays in the light transmissive body 141E.

In other embodiments, the hollow grooves 1416 may communicate with each other to form an annular hollow groove (see FIG. 10A) with the lower accommodating groove 1415E being surrounded by the lower accommodating groove 1415E. The annular hollow groove can further reduce use of materials for manufacturing the light transmissive body 141E.

Figure 8:
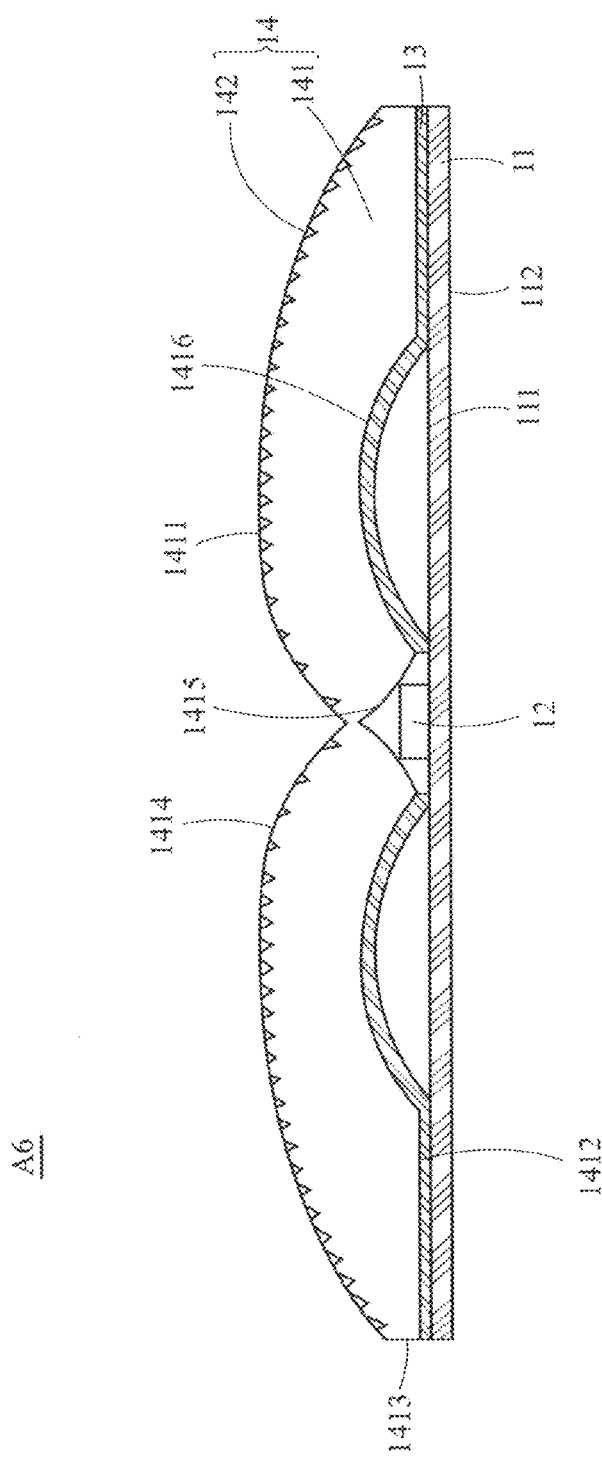
FIG. 8 is a cross-sectional view of a lighting device according to a sixth preferred embodiment of the present invention.
Figure 9:
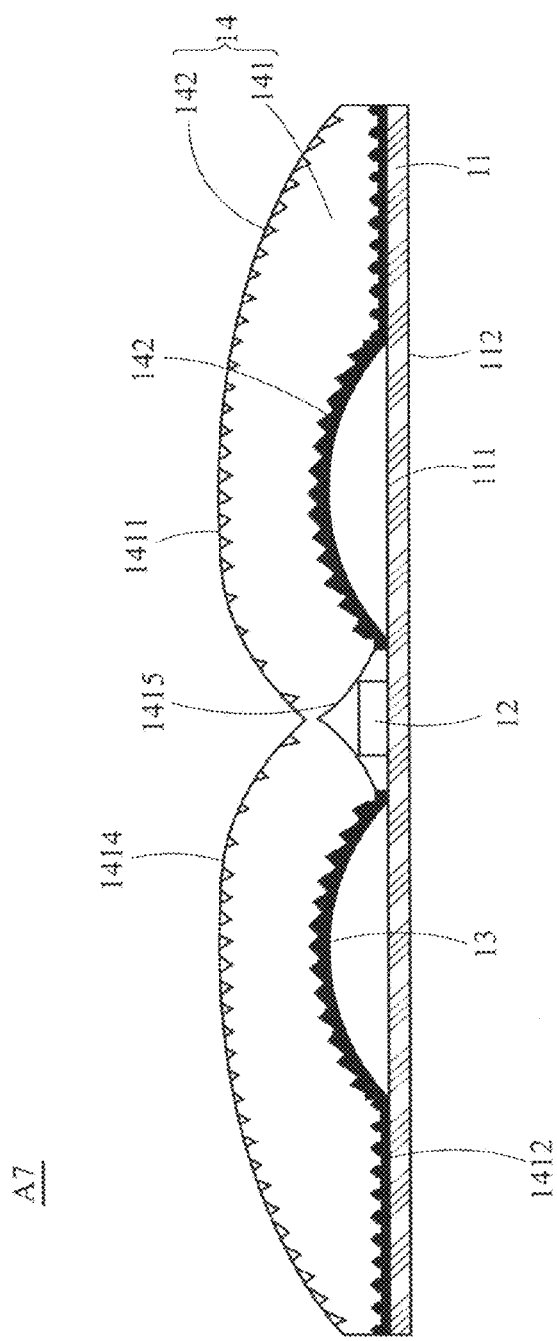
FIG. 9 is a cross-sectional view of a lighting device according to a seventh preferred embodiment of the present invention.

Referring to FIG. 8 and FIG. 9 together, cross-sectional views of lighting devices according to a sixth preferred embodiment and a seventh preferred embodiment of the present invention are shown therein respectively. The lighting device A6 of the sixth preferred embodiment differs from the lighting device A5 mainly in that, the upper surface 1411F of the light transmissive body 141F of the lighting device A6 is not a flat surface but a curved surface; furthermore, the reflective layer 131 is disposed in also the hollow grooves 1416 of the light transmissive body 141F to make it impossible for light rays to exit from the hollow grooves 1416. The lighting device A7 of the seventh preferred embodiment differs from the lighting device A6 mainly in that, the microstructures 142 are further distributed in the hollow grooves 1416 and the reflective layer 132 is recessed into the microstructures 142. However, in other implementations, the reflective layer 132 may also not be recessed into the microstructures 142 (similar to the lighting device A4 shown in FIG. 6) but may be only in contact with or close to the lower surface 1412G.

It shall be appreciated that, although not shown herein, the upper surface 1411E to 1411G of the light transmissive body 141E to 141G of any of the lighting devices A5 to A7 may not be provided with the microstructures 142 (similar to the lighting device A4); or the top surface 111 of the circuit board 11 of any of the lighting devices A5 to A7 may not be provided with the reflective layer 13, 131 or 132.

Figure 10A:
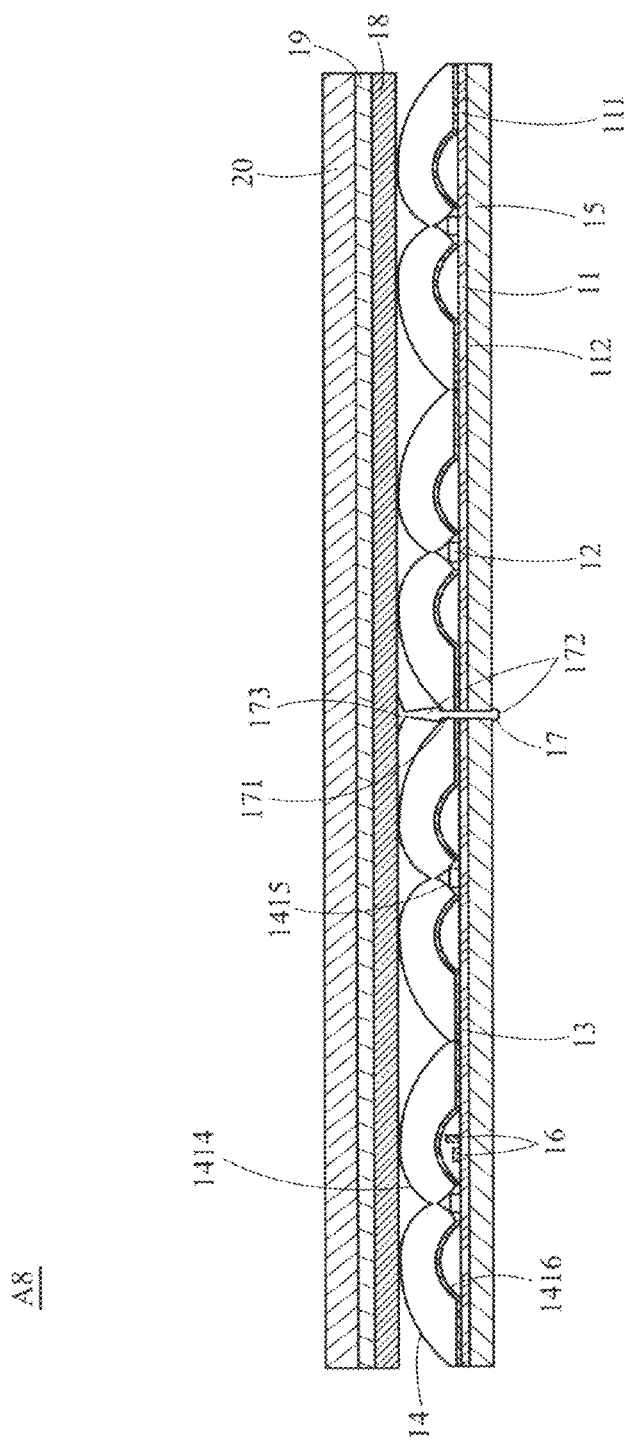
FIG. 10A is a cross-sectional view of a lighting device according to an eighth preferred embodiment of the present invention.
Figure 10B:
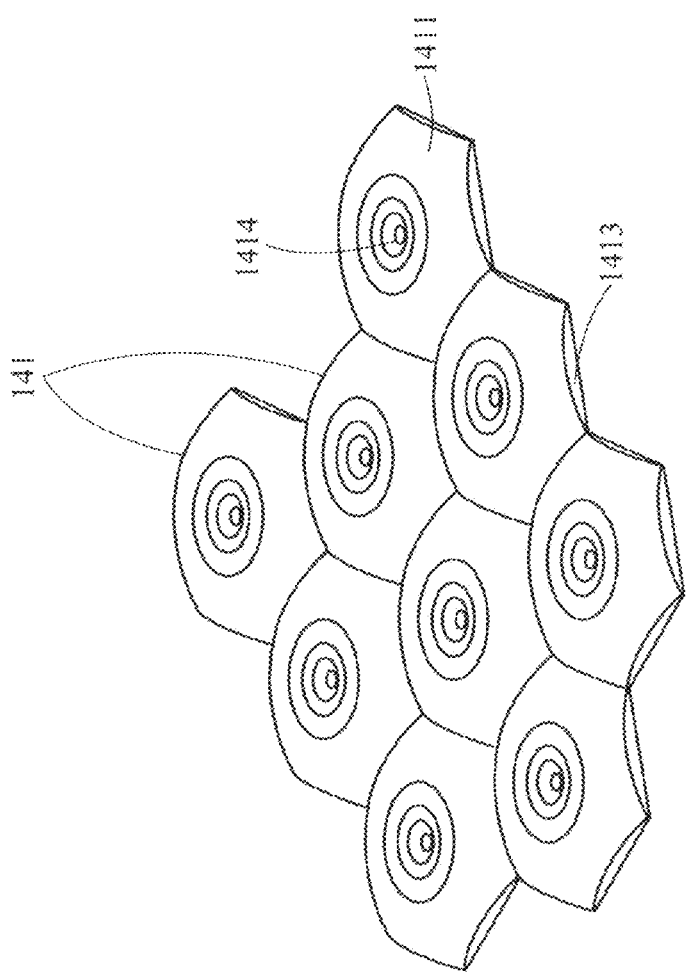
FIG. 10B is a perspective view of a direct-lit light guiding panel of the lighting device shown in FIG. 10A.
Figure 10C:
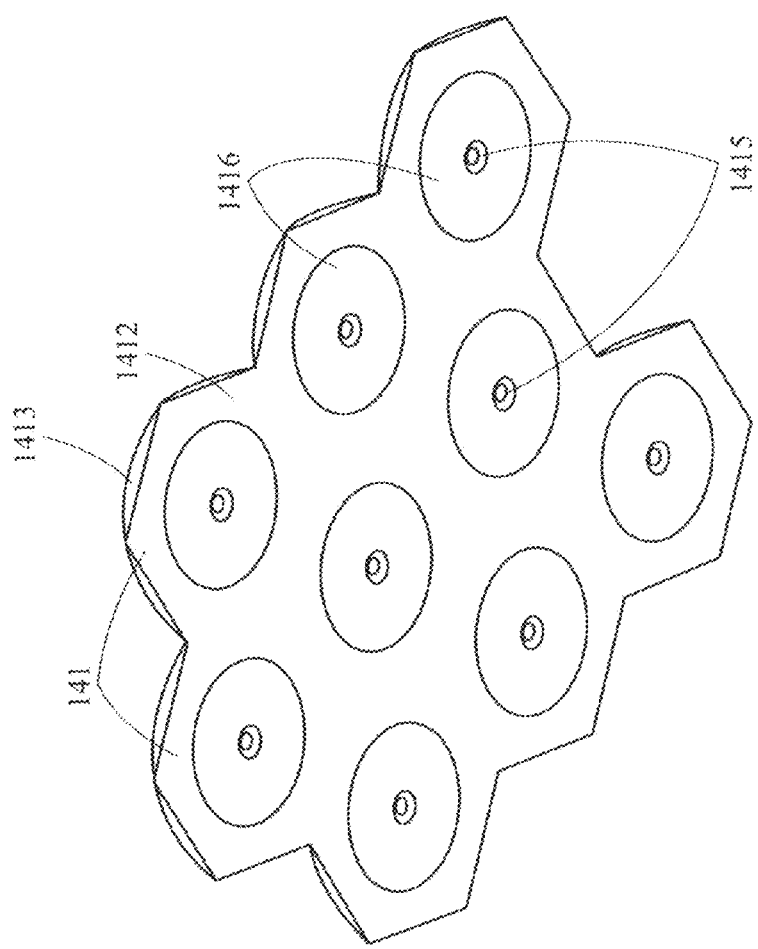
FIG. 10C is a perspective view of the direct-lit light guiding panel of the lighting device shown in FIG. 10A from another viewing angle.

Referring to FIG. 10A, FIG. 10B and FIG. 10C together, FIG. 10A is a cross-sectional view of a lighting device according to an eighth preferred embodiment of the present invention, and FIG. 10B and FIG. 10C are perspective views of a direct-lit light guiding panel of the lighting device shown in FIG. 10A (with the microstructures being not shown therein). The lighting device A8 of this embodiment comprises a plurality of direct-lit light guiding structures 14M which are the same as that of the lighting device A6 of the sixth embodiment; and the direct-lit light guiding structures 14 M are connected with each other side by side to form a direct-lit light guiding panel. Additionally, the light transmissive bodies 141M of the direct-lit light guiding structures 14 M are formed integrally, and the hollow grooves 1416 are all annular hollow grooves. Furthermore, the bottom surfaces 1412 of the light transmissive bodies 141M may be coplanar.

The lighting device A8 further comprises a plurality of light sources 12 and a supporting base 15, and may optionally (if necessary) comprise at least one electronic component 16 and at least one connecting rod 17. Hereinbelow, the individual elements will be described in sequence.

The light sources 12 are disposed on the top surface 111 of the circuit board 11, and the direct-lit light guiding structures 14M are also disposed on the top surface 111 of the circuit board 11. The light sources 12 are accommodated within the lower accommodating grooves 1415M of the direct-lit light guiding structures 14M respectively. Additionally, the light transmissive bodies 141M of the direct-lit light guiding structures 14M may be formed integrally. The supporting base 15 (or termed as a base or a backplate) functions to enhance the structural strength of the lighting device A8 or to improve the heat dissipating efficiency. The supporting base 15 may be an aluminum (Al) plate disposed on the bottom surface 112 of the circuit board 11.

The at least one electronic component 16 (e.g., a control chip, a driver IC, a resistor, a capacitor and etc) is also disposed on the top surface 111 of the circuit board 11 and accommodated within one of the hollow grooves 1416. If no hollow groove 1416 is formed in the direct-lit light guiding structures 14A as shown in FIG. 1, then the circuit board 11 must be made to have additional portions that extend out of the direct-lit light guiding structures 14A so that the electronic components 16 can be disposed outside the direct-lit light guiding structures 14A without interfering with disposition of the direct-lit light guiding structures 14A on the circuit board 11. As can be known from this, formation of the hollow grooves 1416 in the direct-lit light guiding structures 14M can no only reduce use of materials for manufacturing the light transmissive bodies 141M, but also reduce the width or length of the circuit board 11.

The at least one connecting rod 17 serves to fix the circuit board 11, the direct-lit light guiding structures 14M and the supporting base 15 together. The connecting rod 17 comprises a rod body 171, two stopping portions 172 and a supporting plane 173. The rod body 171 penetrates the circuit board 11, one of the direct-lit light guiding structures 14M, and the supporting base 15. The two stopping portions 172 may each be a barb, and are buckled to the direct-lit light guiding structure 14M and the supporting base 15 respectively, so that the circuit board 11, the direct-lit light guiding structure 14M and the supporting base 15 cannot move freely relative to each other, thus accomplishing the purpose of fixing. The supporting plane 173 is disposed at a top end of the rod body 171 and is level with the upper surfaces 1411M of the light transmissive bodies 141M.

The lighting device A8 may further have a diffuser 18, an optical layer 19 and a liquid crystal panel 20 disposed thereon to form a backlight module of a liquid crystal display (LCD).

The diffuser 18, the optical layer 19 and the liquid crystal panel 20 are sequentially stacked on the upper surfaces 1411M of the light transmissive bodies 141M. A bottom surface of the diffuser 18 may be adhered to the supporting plane 173 of the connecting rod 17 to prevent non-uniformity in brightness caused by warping of the diffuser 18. The optical layer 19 may comprise a bottom diffuser film, a brightness enhancement film (BEF), a dual brightness enhancement film (DBEF), a top diffuser film or other films commonly used in a backlight module.

Figure 11A:
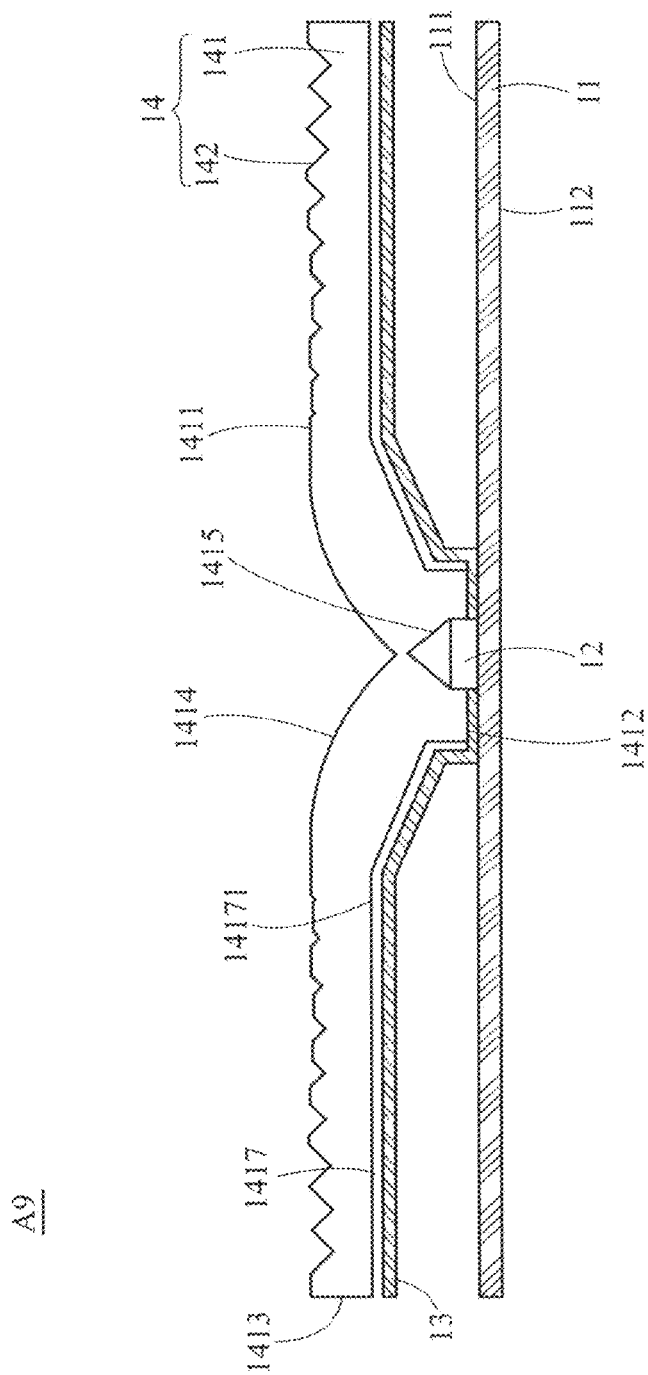
FIG. 11A is a cross-sectional view of a lighting device according to a ninth preferred embodiment of the present invention.

Referring to FIG. 11A, there is shown a cross-sectional view of a lighting device according to a ninth preferred embodiment of the present invention. Similar to the lighting device A5 of the fifth embodiment, the light transmissive body 141H of the lighting device A9 of this embodiment comprises a plurality of hollow grooves 1417. The hollow grooves 1417 are formed on the lower surface 1412H of the light transmissive body 141H, and the lower accommodating groove 1415H is formed between the hollow grooves 1417. Furthermore, the hollow grooves 1417 extend to the outer peripheral surface 1413 of the light transmissive body 141H. The hollow grooves 1417 may each have a flat surface 14171 substantially parallel to the upper surface 1411H.

The hollow grooves 1417 can reduce use of materials for manufacturing the light transmissive body 141H to a greater extent as compared to the hollow grooves 1416. Even further, a sum of volumes of the hollow grooves 1417 may be greater than a volume of the light transmissive body 141H; this can reduce use of materials for manufacturing the light transmissive body 141H by more than a half as compared to a light transmissive body having no hollow groove 1417 formed therein (e.g., as shown in FIG. 1). It shall be appreciated that, said volume of the light transmissive body 141H only comprises solid portions of the light transmissive body 141H but not comprises hollow portions thereof (e.g., the upper conical groove 1414H, the lower accommodating groove 1415H and the hollow grooves 1417).

The hollow grooves 1417 have no influence on propagation of light rays in the light transmissive body 141H for the following reasons. Referring back to FIG. 3B and FIG. 3C together, light rays after the point P (i.e., after being reflected by the upper conical groove 1414H) all exhibit an angle whose complementary angle is greater than the critical angle, so the light rays can still be totally reflected within the light transmissive body 141H even when thickness of the light transmissive body 141H decreases after the point P. The space formed due to thinning of the light transmissive body 141H after the point P is just a portion of the corresponding hollow groove 1417.

Figure 11B:
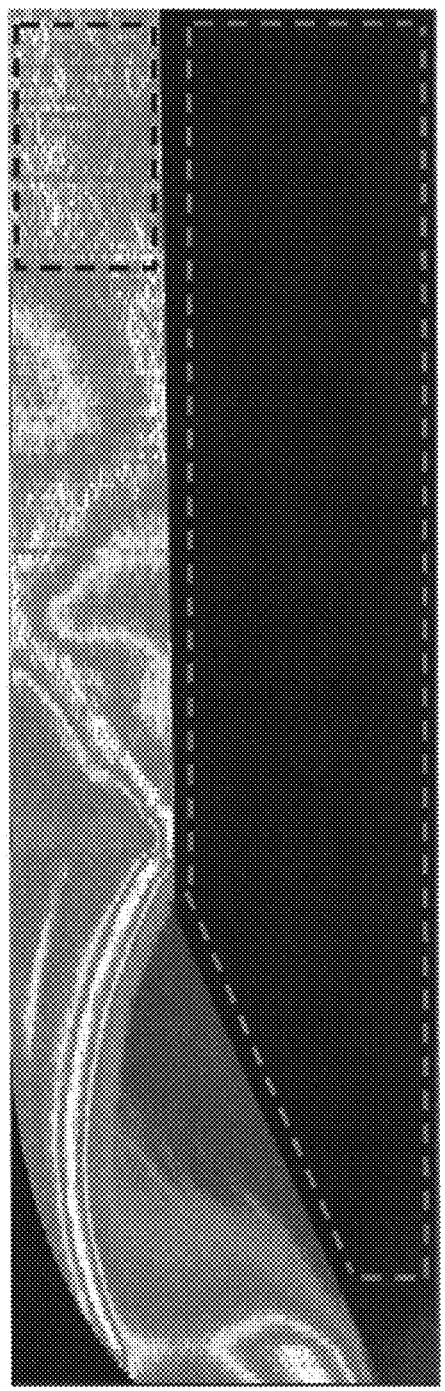
FIG. 11B is a graph of energy distribution of light rays in the light transmissive body shown in FIG. 11A.

Referring to FIG. 11B together, there is shown a graph of energy distribution of light rays in the light transmissive body shown in FIG. 11A. As can be seen clearly from the light distribution, the light rays impinging on the flat surface 14171 and the upper surface 1411H can all be totally reflected when the light transmissive body 141H is thinned and has no microstructure disposed formed thereon.

Referring back to FIG. 11A, besides the hollow grooves 1417, the reflective layer 133 of the lighting device A9 is also different from those of the previous embodiments. In detail, the reflective layer 133 is not entirely attached to the top surface 111 of the circuit board 11, but is partly located in the hollow grooves 1417 and adjacent to the lower surface 1412H of the light transmissive body 141H.

Figure 11C:
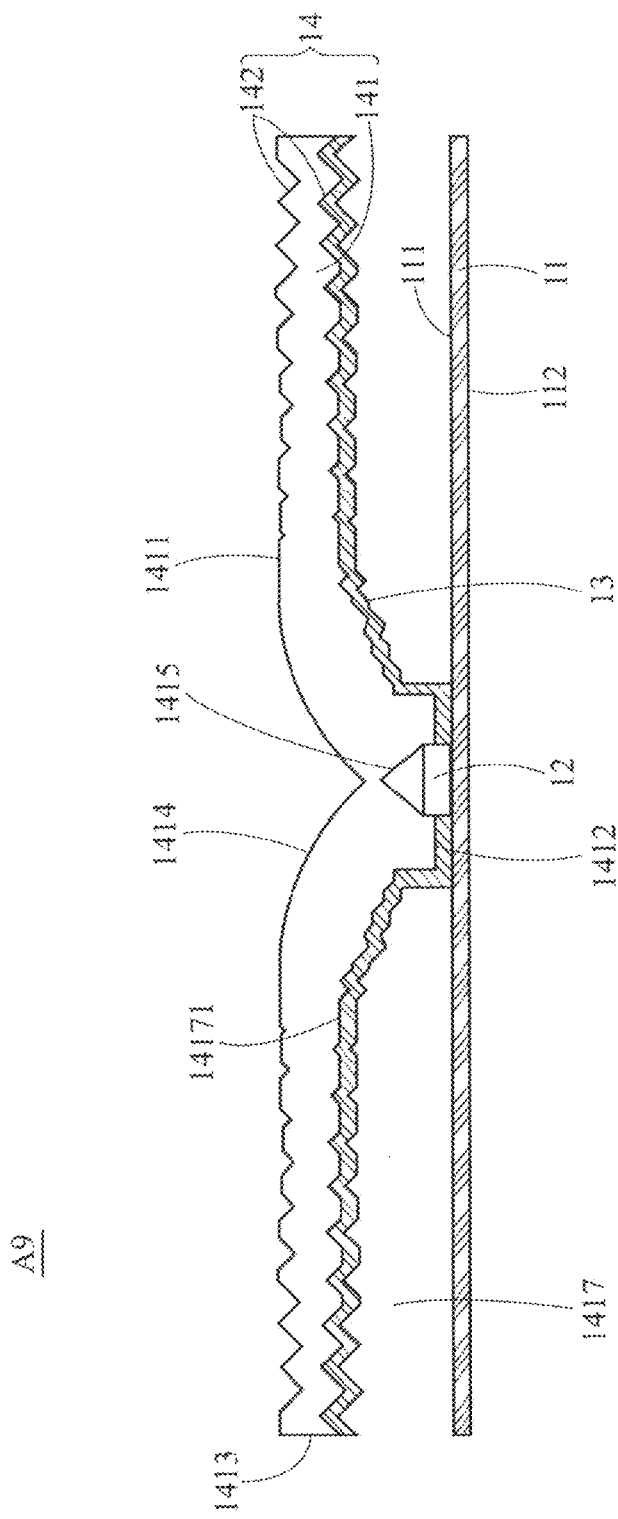
FIG. 11C is another cross-sectional view of the lighting device according to the ninth preferred embodiment of the present invention.
Figure 11D:
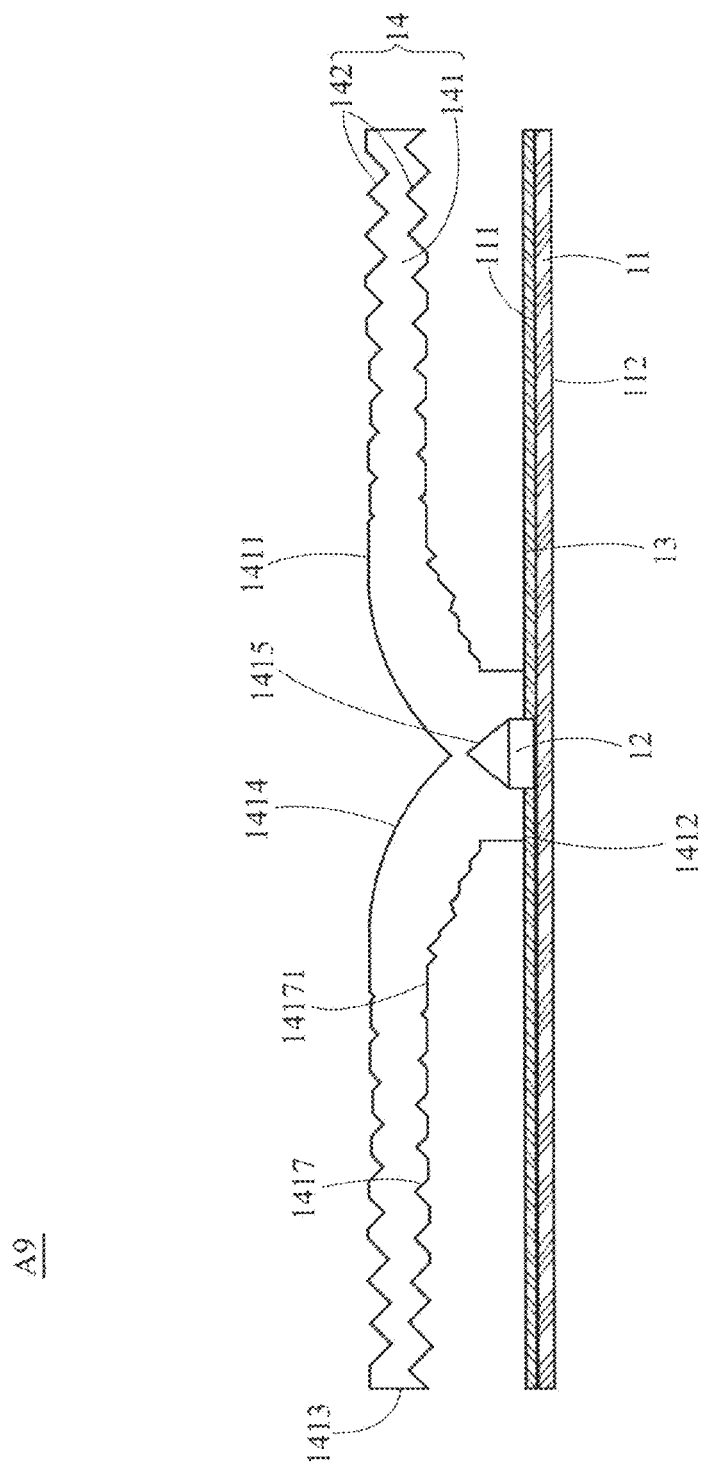
FIG. 11D is a further cross-sectional view of the lighting device according to the ninth preferred embodiment of the present invention.

Besides what shown in FIG. 11A, the lighting device A9 may also have other variations. For example, as shown in FIG. 11C, the microstructures 142 may be distributed on the lower surface 1412I of the light transmissive body 141I to face toward the hollow grooves 1417, and is covered by the reflective layer 134 (e.g., a white paint); alternatively, as shown in FIG. 11D, the reflective layer 13 of the lighting device A9 may be entirely attached on the top surface 111 of the circuit board 11; or alternatively, the lighting device A9 may not be provided with the reflective layer 13 (not shown).

Figure 11E:
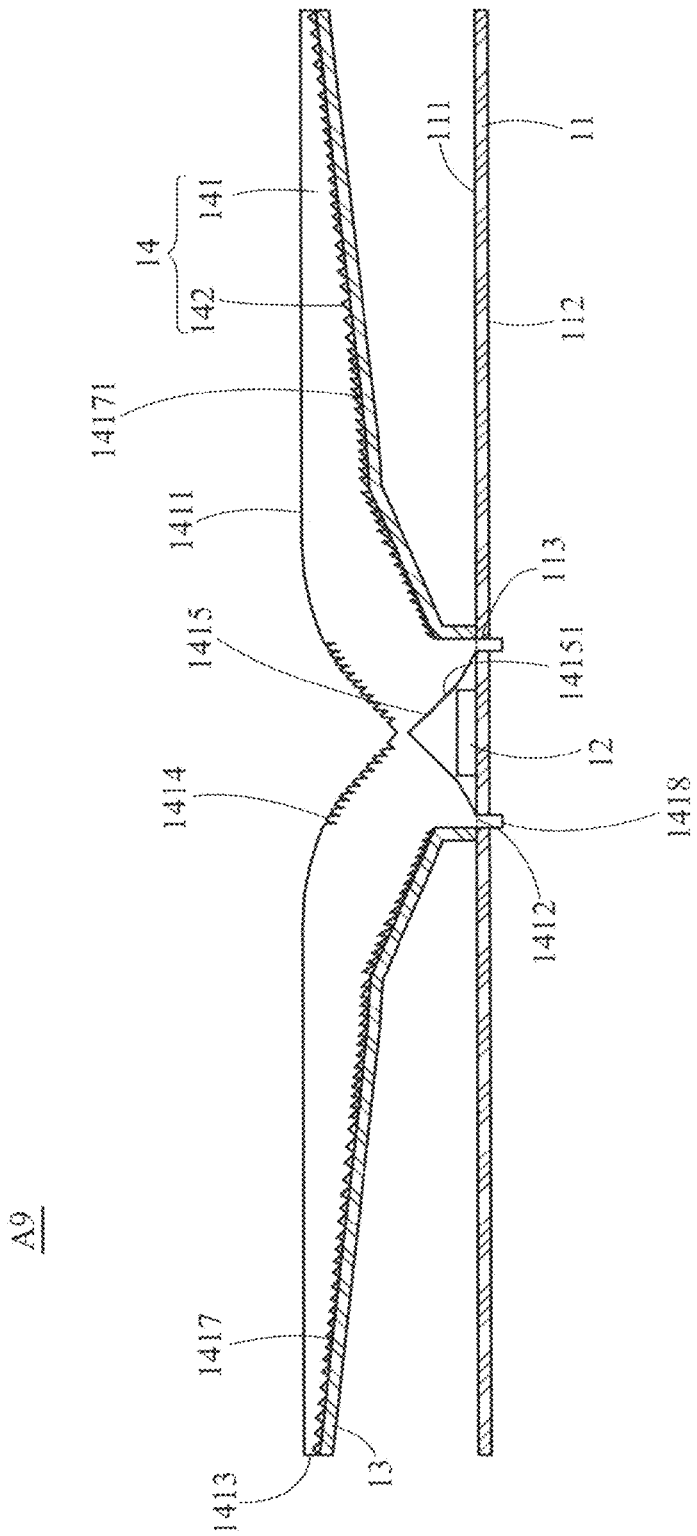
FIG. 11E is yet a further cross-sectional view of the lighting device according to the ninth preferred embodiment of the present invention.

As shown in FIG. 11E, the surface 14171 of each hollow groove 1417 of the light transmissive body 141J may be inclined without being parallel to the upper surface 1411J; and the lower accommodating groove 1415J of the light transmissive body 141J may only comprise the conical portion 14151 and, therefore, substantially present the form of a lower conical groove.

The light transmissive body 141J may further comprise a plurality of protrusion structures 1418, which protrude downward from the bottom surface 1412 of the light transmissive body 141J and are located between the lower accommodating groove 1415 and the hollow grooves 1417. The circuit board 11 has a plurality of through-holes 113. The protrusion structures 1418 can be inserted into the through-holes 113 respectively to fix the light transmissive body 141J onto the circuit board 11 without the need of other fixing elements (e.g., the connecting rod 17 shown in FIG. 10A).

An end of each protrusion structure 1418 may be formed with a stopping structure (e.g., a barb, not shown) so that the protrusion structure 1418 cannot be pulled out after being inserted into the corresponding through-hole 113. This allows the light transmissive body 141J to be fixed on the circuit board 11 more securely.

In other embodiment (not shown), the length of the protrusion structure 1418 may be smaller than the depth of the through-holes 113, so that, after the protrusion structure 1418 being inserted into the through-holes 113, the protrusion structure 1418 would not protrude from the bottom surface 112 of the circuit board 11. As such, the through-holes 113 would have a space therein which is not occupied by the protrusion structure 1418, and the space can be filled up with a glue (not shown) to fix the protrusion structure 1418 with the circuit board 11.

Figure 12A:
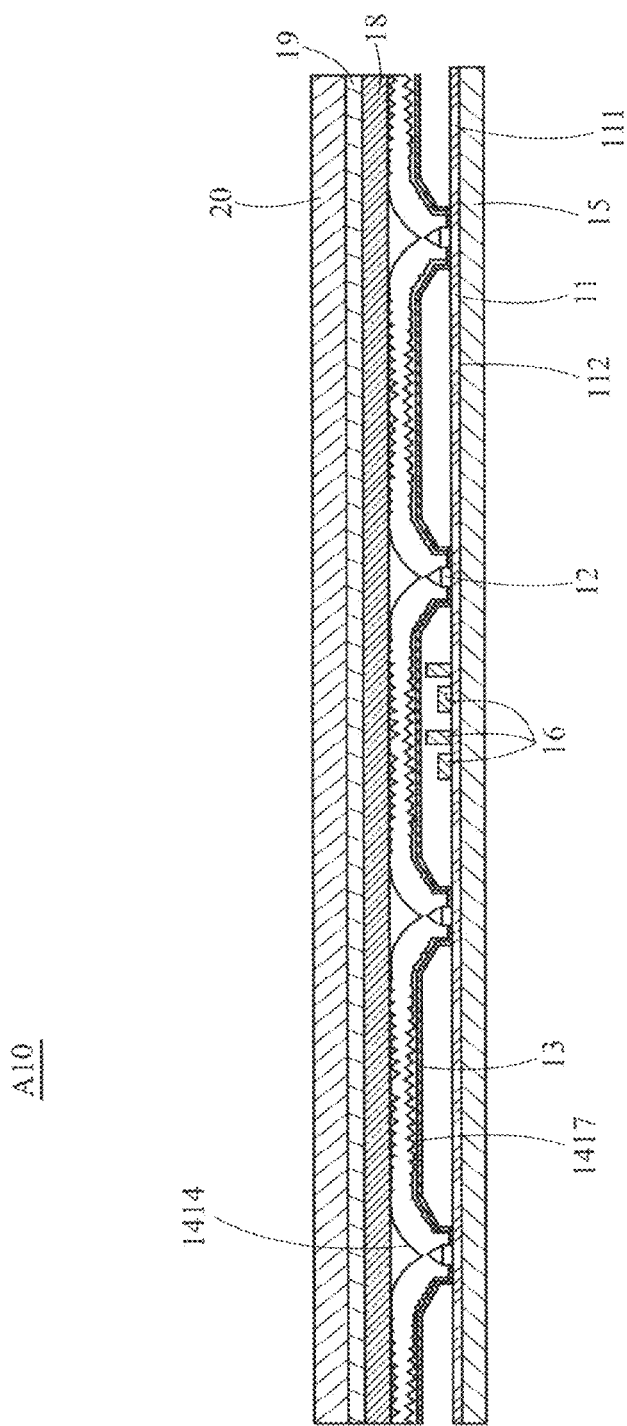
FIG. 12A is a cross-sectional view of a lighting device according to a tenth preferred embodiment of the present invention.
Figure 12B:
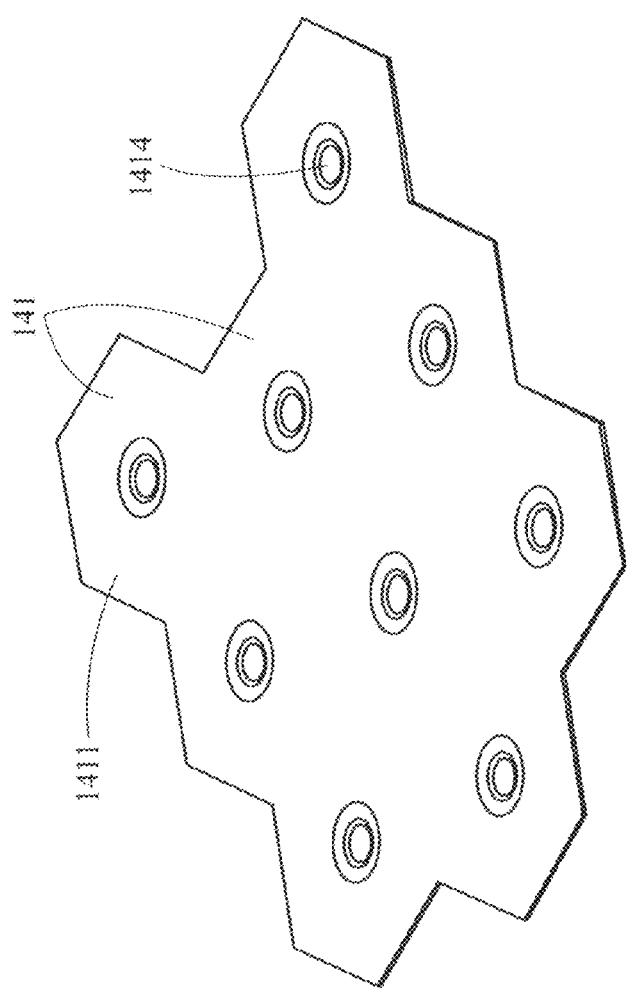
FIG. 12B is a perspective view of a direct-lit light guiding panel of the lighting device shown in FIG. 12A.
Figure 12C:
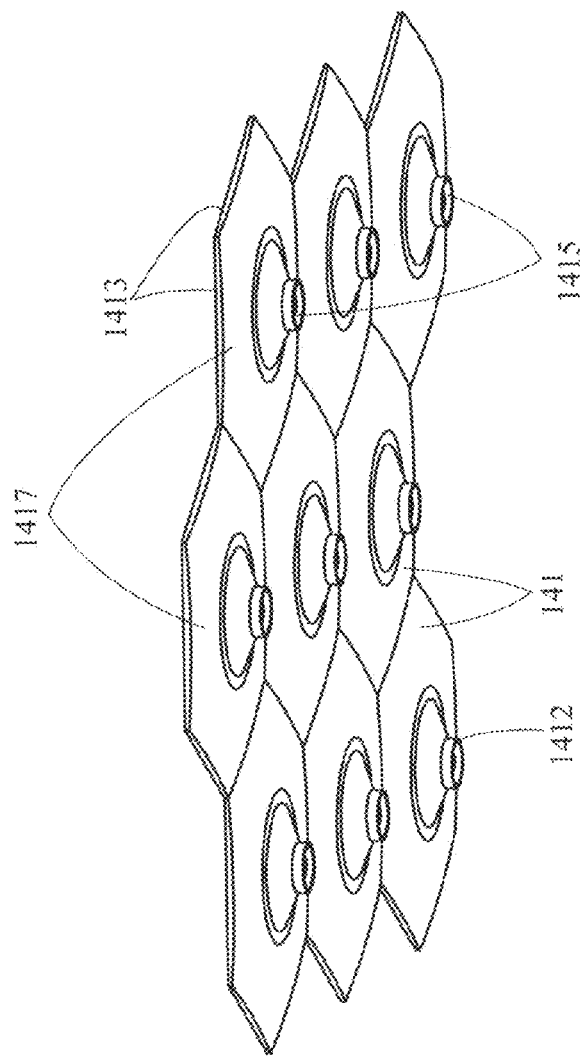
FIG. 12C is a perspective view of the direct-lit light guiding panel of the lighting device shown in FIG. 12A from another viewing angle.

Referring to FIG. 12A, FIG. 12B and FIG. 12C together, FIG. 12A is a cross-sectional view of a lighting device according to a tenth preferred embodiment of the present invention, and FIG. 12B and FIG. 12C are perspective views of a direct-lit light guiding panel of the lighting device shown in FIG. 12A (with the microstructures being not shown). The lighting device A10 of this embodiment comprises a plurality of direct-lit light guiding structures 14N which are the same as that of the lighting device A9 of the ninth embodiment; and the light transmissive bodies 141N are connected with each other to form one direct-lit light guiding panel. Furthermore, the top surfaces 1411N of the light transmissive bodies 141N may be coplanar. The hollow groove 1417 of each of the direct-lit light guiding structures 14N have microstructures 142 distributed therein. The reflective layer 135 is a reflective sheet that is close to the bottom of the microstructures 142 but not recessed into the microstructures 142.

Other elements (including the light sources 12, the supporting base 15, the electronic components 16, the diffuser 18, the optical layer 19 and the liquid crystal panel 20) of the lighting device A10 of this embodiment are just the same as those of the lighting device A8, so no further description will be further made thereon herein.

It is noting that, the hollow grooves 1417 of the light transmissive bodies 141N of the lighting device A10 are relatively large, so more electronic components 16 or thicker electronic components 16 can be accommodated therein.

Figure 13:
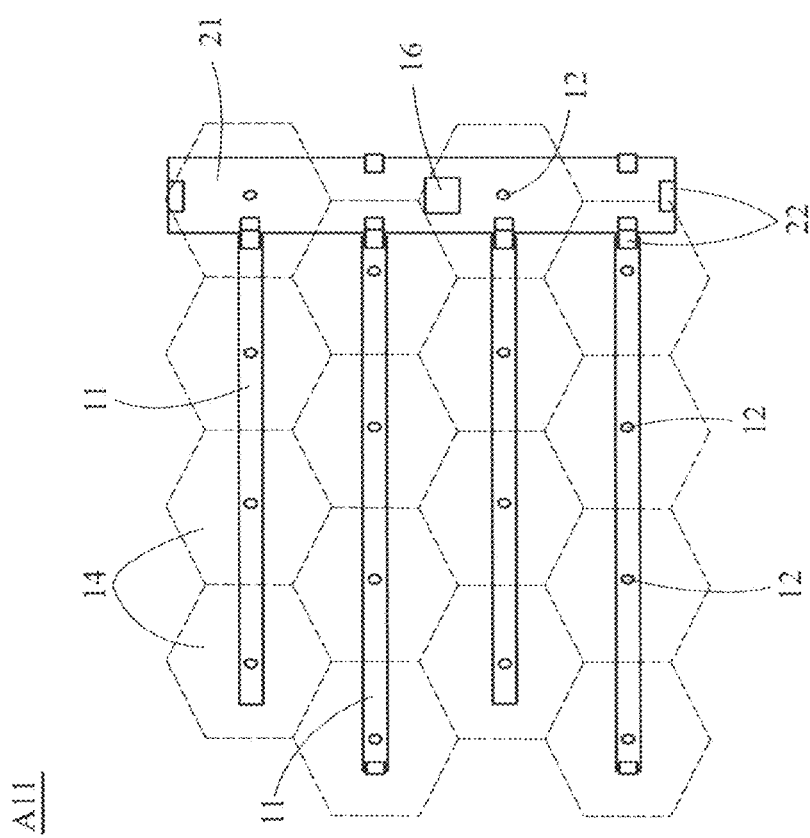
FIG. 13 is a top view of a lighting device according to an eleventh preferred embodiment of the present invention in an assembled status.
Figure 14:
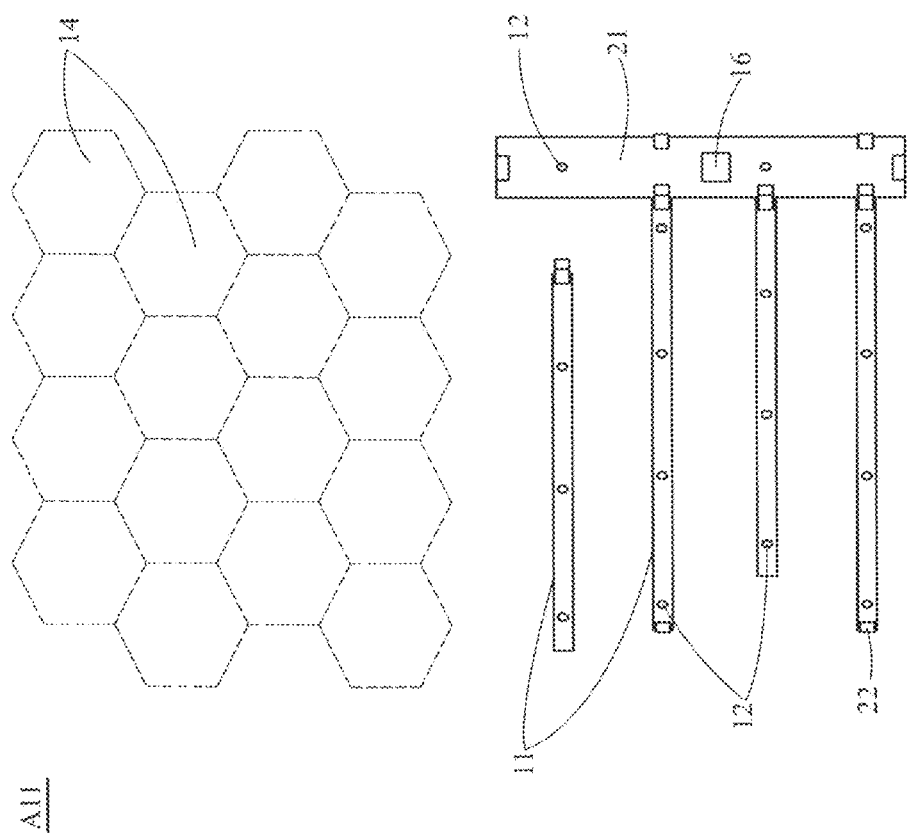
FIG. 14 is a top view of the lighting device according to the eleventh preferred embodiment of the present invention in an exploded status.
Figure 15:
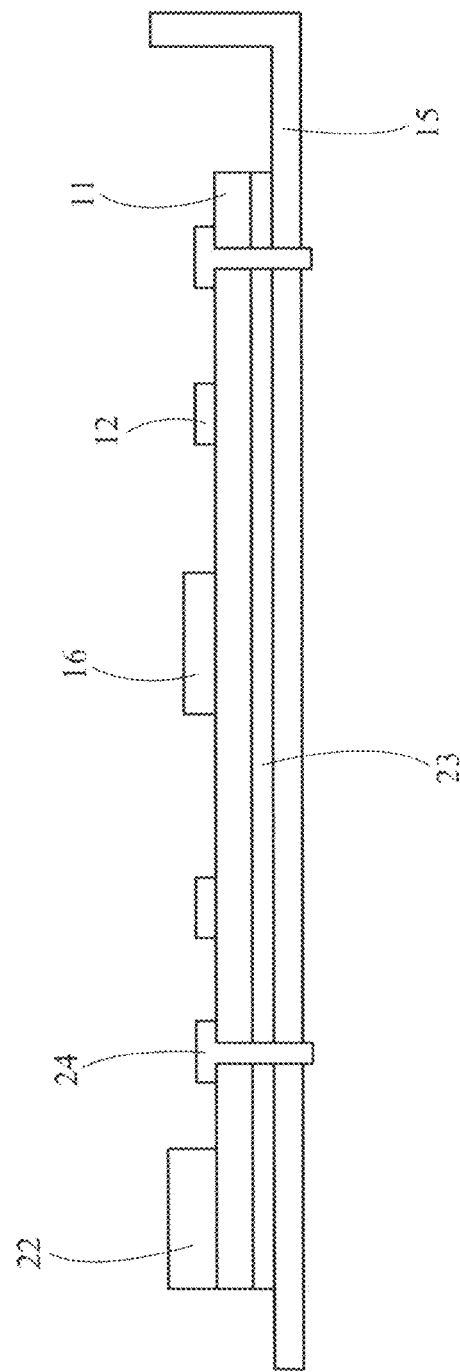
FIG. 15 is a side view of the lighting device according to the eleventh preferred embodiment of the present invention in an assembled status.

Referring to FIG. 13 to FIG. 15 together, a top view in an assembled status, a top view in an exploded status, and a side view in the assembled status of a lighting device according to an eleventh preferred embodiment of the present invention are shown therein respectively. The lighting device A11 of this embodiment comprises a plurality of circuit boards 11, a plurality of light sources 12, a plurality of direct-lit light guiding structures 14K, a supporting base 15, an electronic component 16 and a drive circuit board 21.

The circuit boards 11 are of a strip form, and an end of each of the circuit boards 11 may be electrically connected to the drive circuit board 21 via a connector 22. The circuit boards 11 may be connected with each other. The light sources 12 are disposed on the circuit boards 11 respectively; each of the circuit boards 11 and the light sources 12 disposed thereon may be collectively called a light bar. Because the circuit boards 11 are primarily provided for purpose of installing the light sources 12, the circuit boards 11 may also be termed as light source circuit boards 11. Alternatively, the light sources 12 may also be disposed on the drive circuit board 21.

The electronic component 16 may comprise a control chip and peripheral circuits associated with the control chip. The electronic component 16 is disposed on the drive circuit board 21 so that control signals can be sent by the drive circuit board 21 to control the light sources 12 disposed on the light source circuit boards 11 to emit light rays. The drive circuit board 21 may be fixed to the supporting base 15 by means of a thermally conductive adhesive 23 or a plurality of screws 24. The thermally conductive adhesive 23 helps to transfer thermal energy from the drive circuit board 21 to the supporting base 15 quickly.

Figure 16:
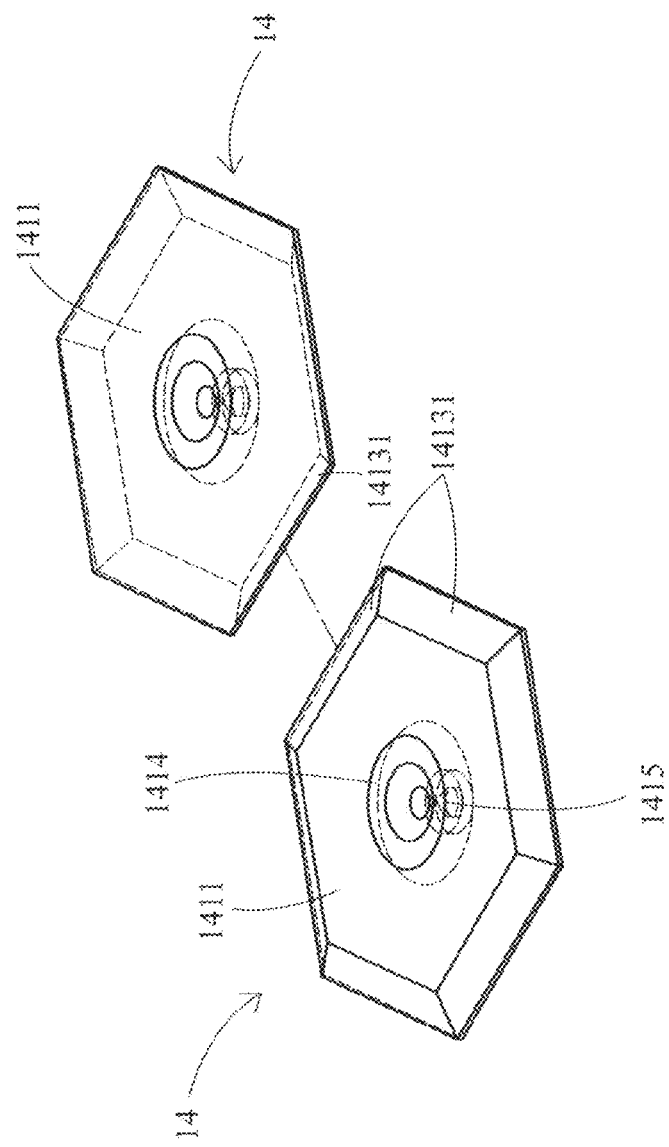
FIG. 16 is a perspective view of two direct-lit light guiding structures of the lighting device shown in FIG. 13 (with the microstructures being not shown)
Figure 17:
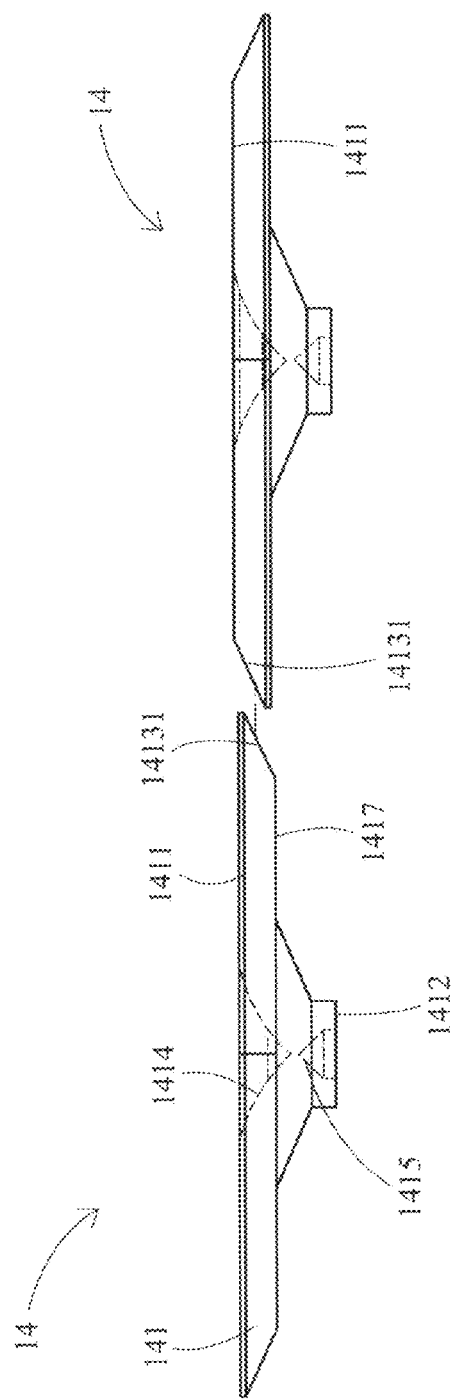
FIG. 17 is a side view of two direct-lit light guiding structures of the lighting device shown in FIG. 13 (with the microstructures being not shown)

The light transmissive bodies 141K of the direct-lit light guiding structures 14K are detachably connected with each other so that a direct-lit light guiding panel is formed by the direct-lit light guiding structures 14K. Referring to FIG. 16 and FIG. 17 together, a perspective view and a side view of two direct-lit light guiding structures of the lighting device shown in FIG. 13 (with the microstructures being not shown) are shown therein respectively. The side surfaces 14131 of the light transmissive body 141K of each direct-lit light guiding structure 14K are inclined with respect to the upper surface 1411K. The inclination angles of the side surfaces 14131 of every two adjacent direct-lit light guiding structures 14K are opposite to each other (i.e., if one of the inclination angles is 45°, then the other is −45°), so the side surfaces 14131 of the two adjacent direct-lit light guiding structures 14K can be abutted on and match with each other.

The inclined side surfaces 14131 allow boundaries between adjacent direct-lit light guiding structures 14K to be overlapped with each other so that light rays at the boundaries are also overlapped. In case an error occurs during assembly of the direct-lit light guiding structures 14K, a non-uniform gap will appear between the adjacent direct-lit light guiding structures 14K. However, the overlapped light rays can render bright lines or dark lines caused by the non-uniform gap less significant after transmitting through the diffuser. It shall be appreciated that, this beneficial effect will become more prominent when the inclination angle ranges between 20° and 70°.

Figure 18:
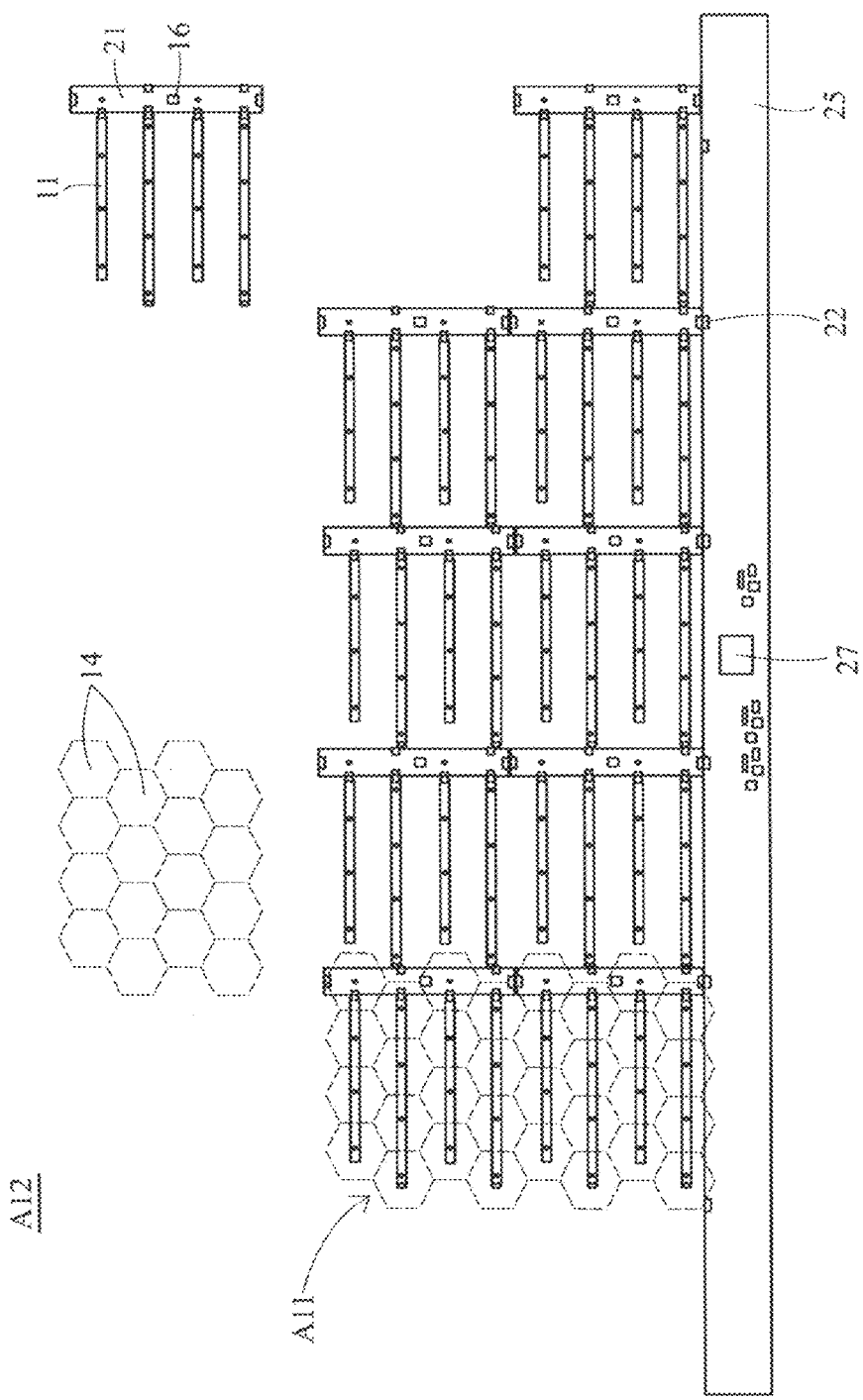
FIG. 18 is a top view of a lighting device according to a twelfth preferred embodiment of the present invention in an exploded status.

Referring to FIG. 18, there is shown a top view of a lighting device according to a twelfth preferred embodiment of the present invention in an exploded status. The lighting device A12 of this embodiment comprises a plurality of lighting devices A11 of the eleventh embodiment and a control circuit board 25. Every two of the drive circuit boards 21 of the lighting devices A11 are connected together, and are then connected to the control circuit board 25 via a connector 22. The control circuit board 25 can transmit a control signal to the drive circuit boards 21 via another electronic component 27 (comprising a micro control unit (MCU) and peripheral circuits thereof) disposed on the control circuit board 25, so that the drive circuit boards 21 can control the light sources 12 on the light source circuit boards 11 to emit light in response to the control signal.

Figure 19:
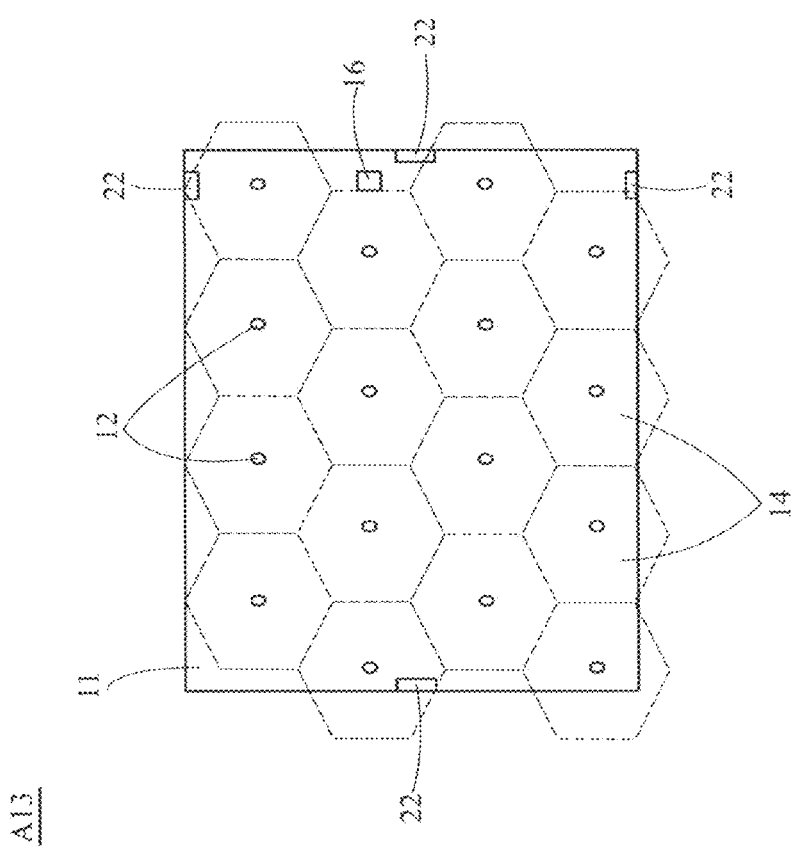
FIG. 19 is a top view of a lighting device according to a thirteenth preferred embodiment of the present invention in an assembled status.
Figure 20:
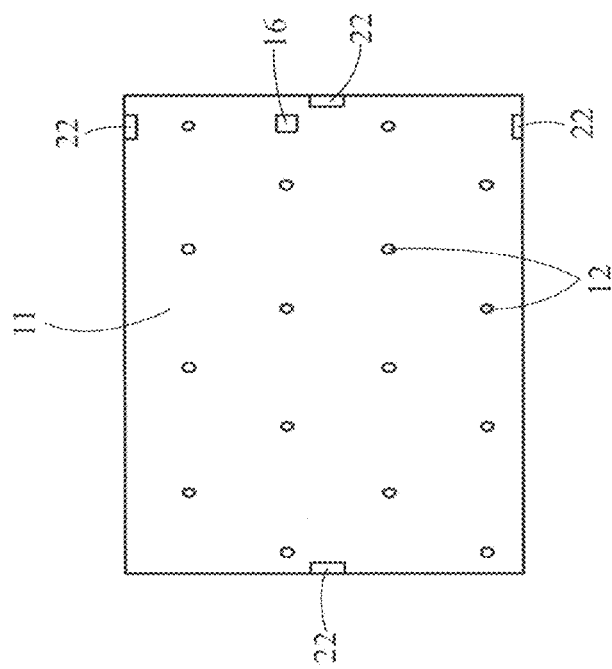
FIG. 20 is a top view of the lighting device according to the thirteenth preferred embodiment of the present invention in an exploded status.
Figure 20:
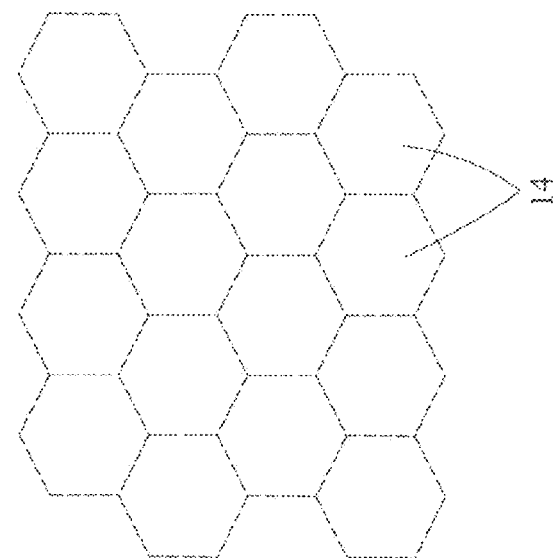

Referring to FIG. 19 and FIG. 20 together, a top view in an assembled status and a top view in an exploded status of a lighting device according to a thirteenth preferred embodiment of the present invention are shown therein respectively. Different from the lighting device A11 of the eleventh embodiment, the lighting device A13 of this embodiment comprises only a single circuit board 11; the light sources 12, the direct-lit light guiding structures 14K, the electronic component 16 and the connectors 22 are all disposed on the circuit board 11. Accordingly, the circuit board 11 is used as a drive circuit board and can directly control the light sources 12 to emit light.

It is noting that, the circuit board 11 is a rectangular board, and is provided with one connector 22 at each of the four sides thereof, so that the four sides can all be connected with other lighting devices (not shown).

Figure 21:
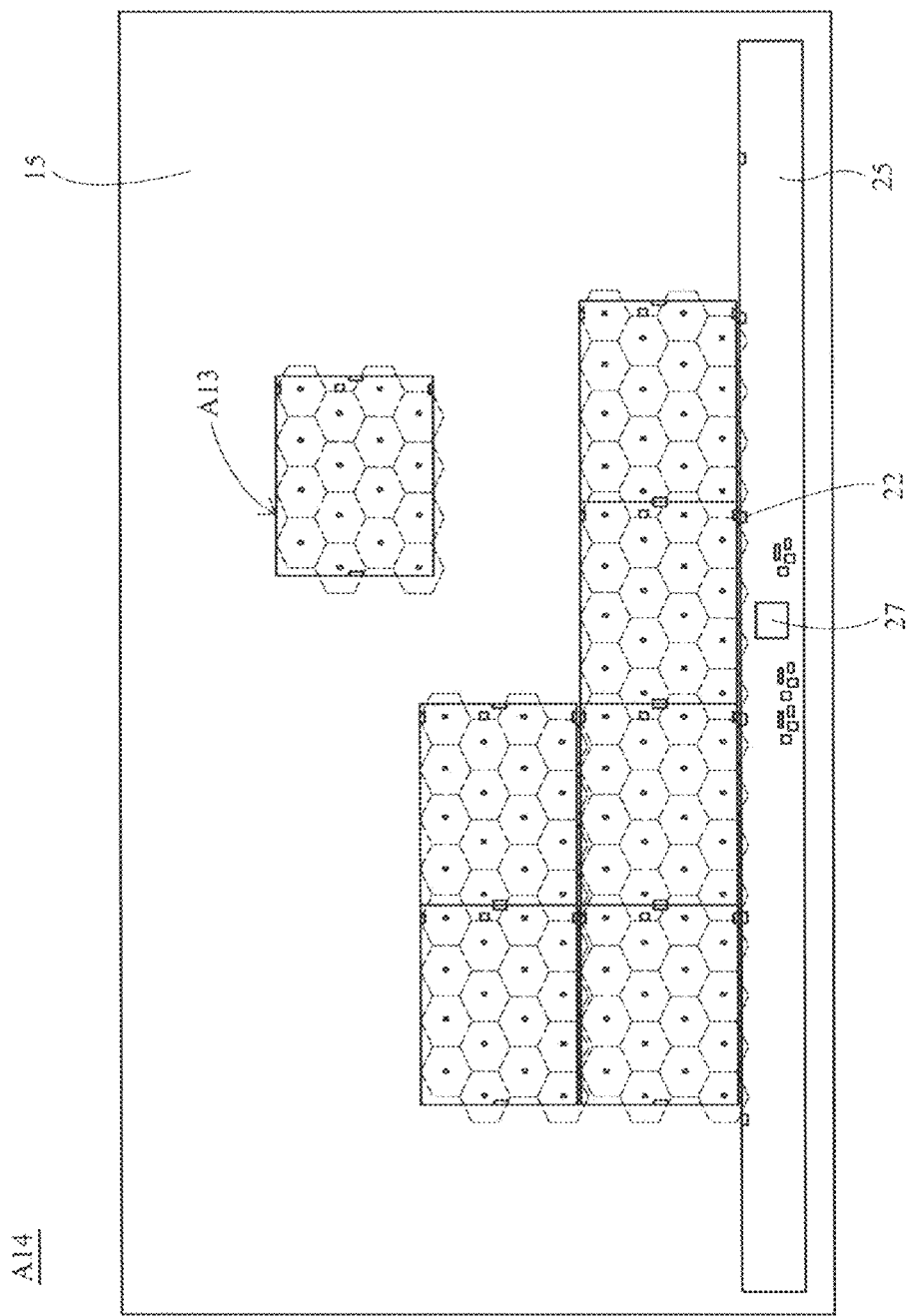
FIG. 21 is a top view of a lighting device according to a fourteenth preferred embodiment of the present invention in an exploded status.

Referring to FIG. 21, there is shown a top view of a lighting device according to a fourteenth preferred embodiment of the present invention in an exploded status. The lighting device A14 of this embodiment comprises a plurality of lighting devices A13 of the thirteenth embodiment, a supporting base 15 and a control circuit board 25. The lighting devices A13 are arranged side by side, and the circuit boards 11 thereof are connected with each other via the connectors 22. The lighting devices A13 are also connected to the control circuit board 25 via the connectors 22. The lighting devices 14 and the control circuit board 25 are all disposed on the supporting base 15.

Figure 22:
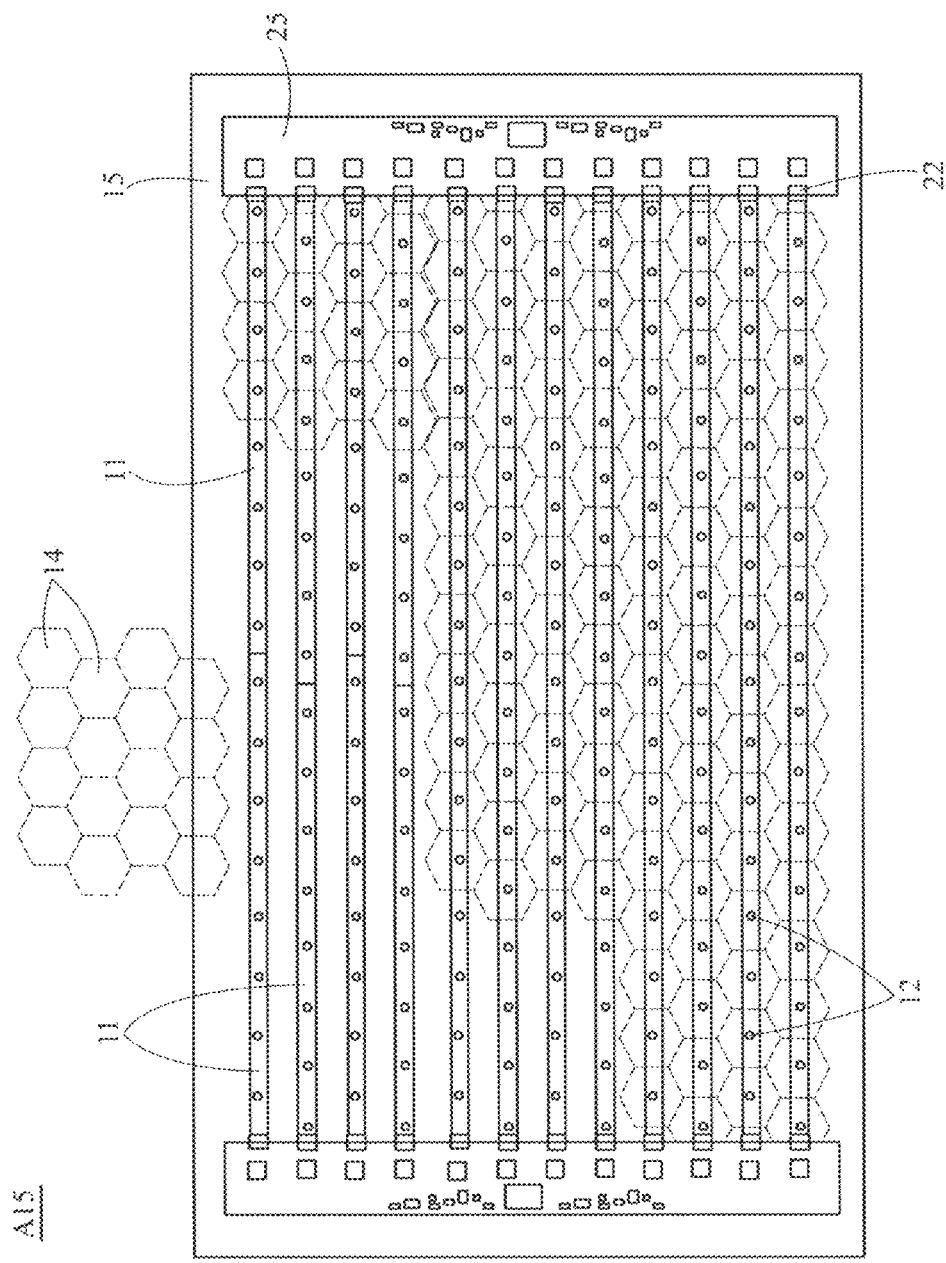
FIG. 22 is a top view of a lighting device according to a fifteenth preferred embodiment of the present invention in an exploded status.

Referring to FIG. 22, there is shown a top view of a lighting device according to a fifteenth preferred embodiment of the present invention in an exploded status. The lighting device A15 of this embodiment comprises a plurality of light source circuit boards 11, a plurality of light sources 12, a plurality of direct-lit light guiding structures 14K, a supporting plate 15 and two control circuit boards 25. The circuit boards 11 and the light sources 12 can form a plurality of light bars. The light bars are connected with each other via the connectors 22 and then connected to one of the control circuit boards 25 via the other connectors 22. Furthermore, the light bars are disposed between the two control circuit boards 25, and the light bars and the two control circuit boards 25 are all disposed on the supporting plate 15. Each of the control circuit boards 25 is configured to control the light sources 12 of the light bars to emit light or not.

Figure 23:
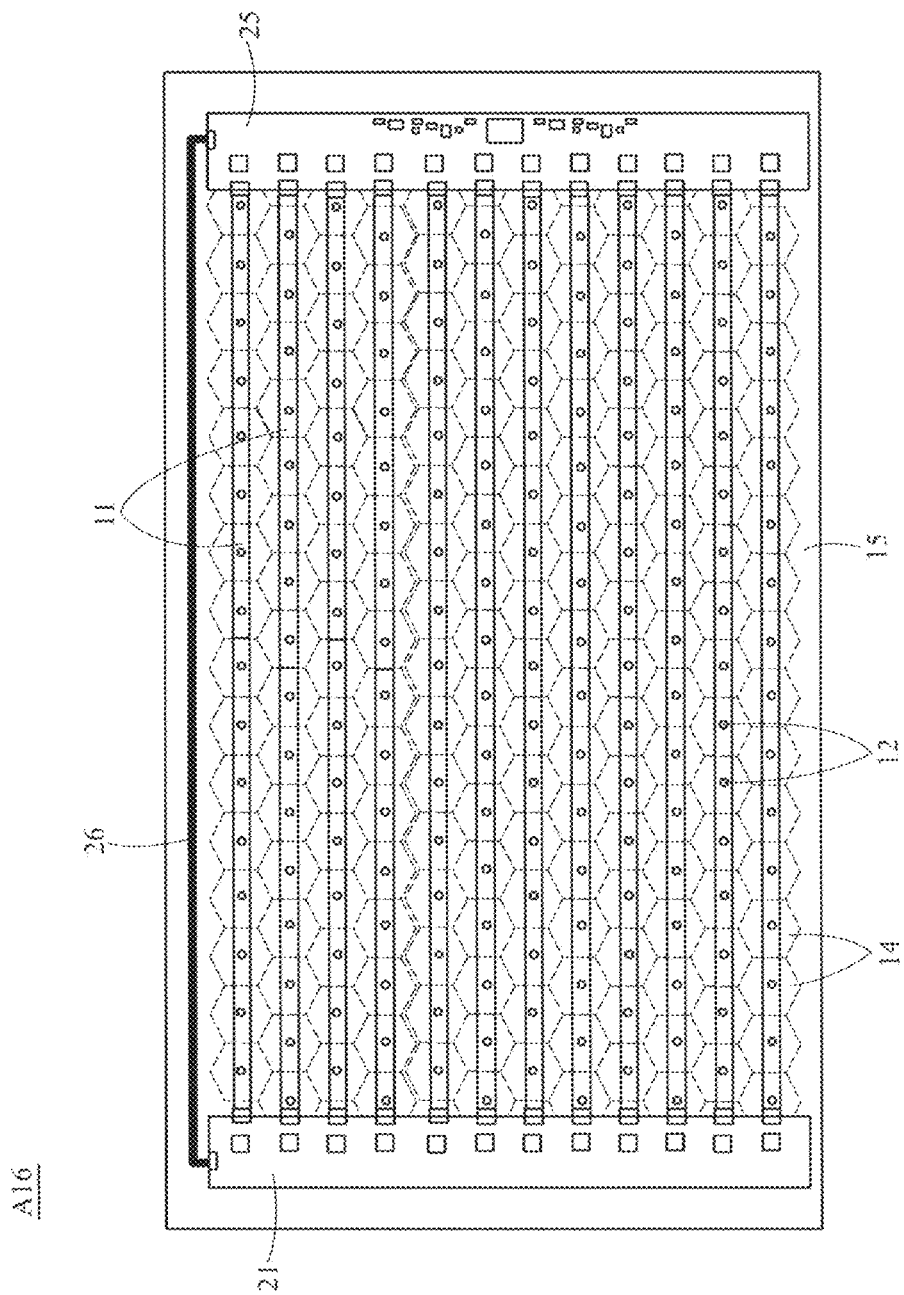
FIG. 23 is a top view of a lighting device according to a sixteenth preferred embodiment of the present invention in an assembled status.

Referring to FIG. 23, there is shown a top view of a lighting device according to a sixteenth preferred embodiment of the present invention in an assembled status. As compared to the lighting device A15 of the fifteenth embodiment, the lighting device A16 of this embodiment comprises only a single control circuit board 25, and further comprises a drive circuit board 21 and a connection line 26 (e.g., a cable). The light bars (comprising the circuit boards 11 and the light sources 12) are disposed between and connected to the control circuit board 25 and the drive circuit board 21.

The control circuit board 25 and the drive circuit board 21 are connected via the connection line 26. The control circuit board 25 may directly control the light sources 12 of the light bars to emit light or not, or may transmit a control signal to the drive circuit board 21 via the connection line 26 so that the drive circuit board 21 controls the light sources 12 of the light bars to emit light or not in response to the control signal.

Figure 24:
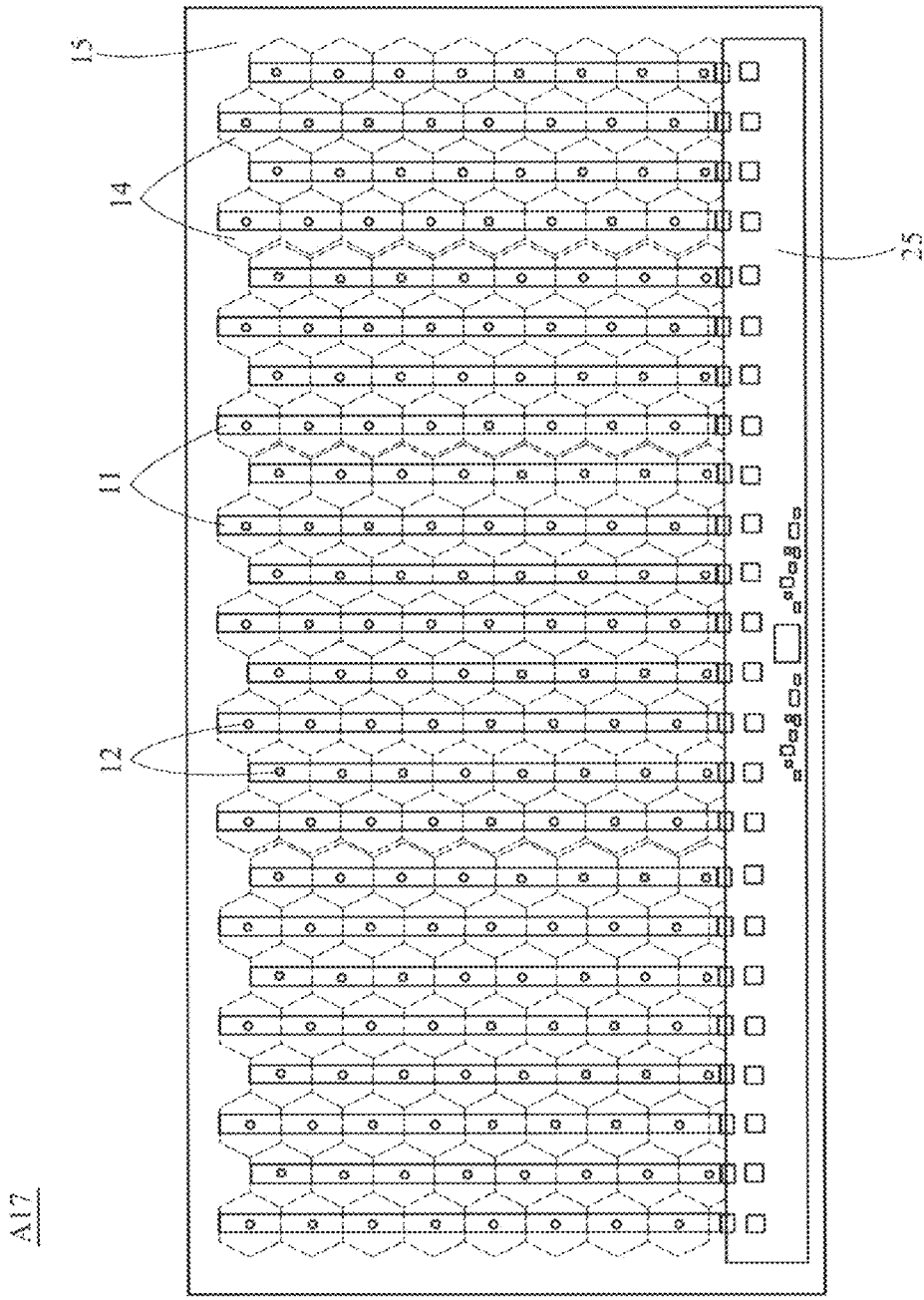
FIG. 24 is a top view of a lighting device according to a seventeenth preferred embodiment of the present invention in an assembled status.

Referring to FIG. 24, there is shown a top view of a lighting device according to a seventeenth preferred embodiment of the present invention in an assembled status. As compared to the lighting device A15 of the fifteenth embodiment, the lighting device A17 of this embodiment comprises only a single control circuit board 25; additionally, the control circuit board 25 is arranged horizontally while the light bars are arranged vertically.

The lighting devices A11 to A17 described above are characterized in that, the numbers of the circuit boards 11, the light sources 12 and the light guiding structures 14K can be extended easily as desired to enlarge the lighting range of the lighting devices A11 to A17.

According to the above descriptions, the lighting device and the direct-lit light guiding structure according to the present invention may comprise the following features:

1. the upper conical grooves and the microstructures of the direct-lit light guiding structure can allow the direct-lit light guiding structure to receive light rays emitted by the light sources and then output the light rays uniformly;
2. The direct-lit light guiding structure can reduce the overall thickness of the lighting device and reduce the number of light sources;
3. The light transmissive body may be made to have a small thickness when the half-cone angle of the lower accommodating groove is equal to the critical angle;
4. Formation of the hollow grooves in the light transmissive body can reduce use of materials for manufacturing the light transmissive body without influencing propagation of light rays in the light transmissive body;
5. Side surfaces of the light transmissive body may be inclined to avoid appearance of bright lines or dark lines at interfaces between two adjacent light transmissive bodies that are not integrally formed;
6. A plurality of such direct-lit light guiding structures can be interconnected to form one direct-lit light guiding panel, and the light transmissive bodies of the direct-lit light guiding structures may be formed integrally;
7. The circuit boards, the light sources and the direct-lit light guiding structures of the lighting device may be arranged in various ways to cater for different applications; and
8. The numbers of circuit boards, light sources and direct-lit light guide structures in the lighting device can all be easily extended to enlarge the lighting range of the lighting device.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A direct-lit light guiding structure, comprising:
a light transmissive body comprising an upper surface and a lower surface opposite to the upper surface, the upper surface being formed with an upper conical groove, the lower surface being formed with a lower accommodating groove corresponding to the upper conical groove, wherein the upper surface partially become a curved surface having a continually varied slope due to presence of the upper conical groove; and
a plurality of microstructures disposed on the light transmissive body;
wherein a critical angle is defined by the light transmissive body and air where the light transmissive body is located, the lower accommodating groove has a conical portion, and a half-cone angle of the conical portion is substantially equal to a complementary angle of the critical angle.

2. The direct-lit light guiding structure as claimed in claim 1, wherein a reflective layer is disposed on the lower surface of the light transmissive body.

3. The direct-lit light guiding structure as claimed in claim 1, wherein the microstructures are distributed on the upper surface or the lower surface of the light transmissive body.

4. The direct-lit light guiding structure as claimed in claim 1, wherein the microstructures are formed integrally with the light transmissive body or is coated onto the light transmissive body.

5. The direct-lit light guiding structure as claimed in claim 1, wherein the microstructures are distributed on the upper surface and the upper conical groove of the light transmissive body to present a three-dimensional (3D) distribution.

6. The direct-lit light guiding structure as claimed in claim 1, wherein the light transmissive body has a plurality of protrusion structures protruding from the lower surface of the light transmissive body.

7. A lighting device, comprising:
at least one circuit board, comprising a top surface and a bottom surface opposite to the top surface;
at least one light source, being disposed on the top surface of the circuit board; and
at least one direct-lit light guiding structure as claimed in claim 1, being disposed on the top surface of the at least one circuit board, wherein the at least one light source is accommodated in the lower accommodating groove of the at least one direct-lit light guiding structure.

8. The lighting device as claimed in claim 7, further comprising a diffuser stacked on the upper surface of the light transmissive body.

9. The lighting device as claimed in claim 7, wherein the light transmissive body has a plurality of protrusion structures protruding from the lower surface of the light transmissive body, the at least one circuit board has a plurality of through-holes, and the protrusion structures are inserted into the through-holes respectively.

10. The lighting device as claimed in claim 7, further comprising a supporting base disposed on the bottom surface of the at least one circuit board.

11. The lighting device as claimed in claim 10, further comprising a thermally conductive adhesive disposed between the at least one circuit board and the supporting base.

12. The lighting device as claimed in claim 7, further comprising a reflective layer, which is disposed on the top surface of the at least one circuit board and located between the at least one direct-lit light guiding structure and the at least one circuit board.

13. The lighting device as claimed in claim 12, wherein the lower surface of the light transmissive body is further formed with a plurality of hollow grooves, and the lower accommodating groove is located between the hollow grooves.

14. The lighting device as claimed in claim 13, further comprising at least one electronic component, which is disposed on the at least one circuit board and accommodated in one of the hollow grooves.

15. A direct-lit light guiding panel, comprising a plurality of direct-lit light guiding structures as claimed in claim 1, wherein the light transmissive bodies of the direct-lit light guiding structures are connected to one another.

16. The direct-lit light guiding panel as claimed in claim 15, wherein the light transmissive bodies of the direct-lit light guiding structures are integrally formed.

17. The direct-lit light guiding panel as claimed in claim 15, wherein the light transmissive bodies of the direct-lit light guiding structures are detachably connected to one another, and each of the light transmissive bodies further comprises an outer peripheral surface, and the outer peripheral surface of each of the light transmissive bodies abuts on and matches with the outer peripheral surface of the adjacent light transmissive body.

18. The direct-lit light guiding panel as claimed in claim 17, wherein the outer peripheral surface of each of the light transmissive bodies comprises six side surfaces connected to one another, the side surfaces are inclined with respect to the upper surface, and the side surfaces of any two adjacent light transmissive bodies have inclined angles opposite to each other.

19. The direct-lit light guiding structure as claimed in claim 1, wherein the lower surface of the light transmissive body is further formed with a plurality of hollow grooves, and the lower accommodating groove is located between the hollow grooves.

20. The direct-lit light guiding structure as claimed in claim 19, wherein the hollow grooves communicate with each other to form an annular hollow groove, and the lower accommodating groove is surrounded by the annular hollow groove.

21. The direct-lit light guiding structure as claimed in claim 19, wherein the microstructures are distributed in the hollow grooves.

22. The direct-lit light guiding structure as claimed in claim 19, wherein a reflective layer is disposed on the lower surface and in the hollow grooves of the light transmissive body.

23. The direct-lit light guiding structure as claimed in claim 19, wherein the light transmissive body further comprises an outer peripheral surface connecting the upper surface and the lower surface, and the hollow grooves extend to the outer peripheral surface.

24. The direct-lit light guiding structure as claimed in claim 23, wherein a sum of volumes of the hollow grooves is greater than a volume of the light transmissive body.

25. The direct-lit light guiding structure as claimed in claim 23, wherein the outer peripheral surface comprises six side surfaces connected with one another, and the side surfaces are inclined with respect to the upper surface.

26. The direct-lit light guiding structure as claimed in claim 23, wherein the microstructures are distributed in the hollow grooves.

27. The direct-lit light guiding structure as claimed in claim 23, wherein a reflective layer is disposed on the lower surface and in the hollow grooves of the light transmissive body.

* * * * *